(12) United States Patent
Kataeva et al.

(10) Patent No.: US 11,501,146 B2
(45) Date of Patent: Nov. 15, 2022

(54) CONVOLUTIONAL NEURAL NETWORK

(71) Applicant: DENSO CORPORATION, Kariya (JP)

(72) Inventors: Irina Kataeva, Kariya (JP); Shigeki Otsuka, Kariya (JP)

(73) Assignee: DENSO CORPORATION, Kariya (JP)

(\*) Notice: Subject to any disclaimer, the term of this patent is extended or adjusted under 35 U.S.C. 154(b) by 449 days.

(21) Appl. No.: 16/731,667

(22) Filed: Dec. 31, 2019

(65) Prior Publication Data

US 2020/0134436 A1 Apr. 30, 2020

Related U.S. Application Data

(63) Continuation of application No. PCT/JP2018/020712, filed on May 30, 2018.

(30) Foreign Application Priority Data

Jul. 6, 2017 (JP) .............................. JP2017-133046

(51) Int. Cl.
*G06N 3/063* (2006.01)
*G06N 3/04* (2006.01)
*G06T 9/00* (2006.01)

(52) U.S. Cl.
CPC .............. *G06N 3/063* (2013.01); *G06N 3/04* (2013.01); *G06T 9/002* (2013.01)

(58) Field of Classification Search
None
See application file for complete search history.

(56) References Cited

U.S. PATENT DOCUMENTS

| 10,460,211 | B2 * | 10/2019 | Vanhoucke | G06N 3/08 |
| 10,692,209 | B2 * | 6/2020 | Sashida | G06K 9/6273 |
| 10,943,166 | B2 * | 3/2021 | Du | G06N 3/0454 |
| 2016/0336064 | A1 | 11/2016 | Seo et al. | |
| 2017/0017879 | A1 | 1/2017 | Kataeva et al. | |
| 2017/0243085 | A1 * | 8/2017 | Vanhoucke | G06N 3/08 |
| 2017/0316828 | A1 | 11/2017 | Hu et al. | |
| 2018/0232629 | A1 * | 8/2018 | Du | G06N 3/04 |
| 2018/0286040 | A1 * | 10/2018 | Sashida | G06V 10/454 |
| 2019/0035463 | A1 | 1/2019 | Hu et al. | |

(Continued)

OTHER PUBLICATIONS

A. Krizhevsky, I. Sutskever, and G. E. Hinton, "Imagenet classification with deep convolutional neural networks," in Advances in neural information processing systems, pp. 1097-1105, 2012.

(Continued)

*Primary Examiner* — James A Thompson
(74) *Attorney, Agent, or Firm* — Maschoff Brennan

(57) ABSTRACT

A image recognition system includes a first convolution layer, a pooling layer, a second convolution layer, a crossbar circuit having a plurality of input lines, at least one output line intersecting with the input lines, and a plurality of weight elements that are provided at intersection points between the input lines and the output line, weights each input value input to the input lines to output to the output line, and a control portion that selects from convolution operation results of the first convolution layer, an input value needed to acquire each pooling operation result needed to perform second filter convolution operation at each shift position in the second convolution layer, and inputs the input value selected to the input lines.

14 Claims, 18 Drawing Sheets

(56) References Cited

U.S. PATENT DOCUMENTS

| | | | | |
|---|---|---|---|---|
| 2019/0340508 | A1* | 11/2019 | Liu | G06N 3/08 |
| 2020/0042871 | A1* | 2/2020 | Francini | G06K 9/6256 |
| 2020/0342301 | A1* | 10/2020 | Miao | G06N 3/0454 |
| 2021/0110236 | A1* | 4/2021 | Shibata | G06N 3/0454 |
| 2021/0158132 | A1* | 5/2021 | Huynh | G06N 3/04 |
| 2021/0365765 | A1* | 11/2021 | Kim | G06N 3/063 |

OTHER PUBLICATIONS

C. Szegedy, W. Liu, Y. Jia, P. Sermanet, S. Reed, D. Anguelov, D. Erhan, V. Vanhoucke, and A. Rabinovich, "Going deeper with convolutions," arXiv preprint arXiv: 1409.4842, 2014.

C. Yakopcic, et al. "Memristor based neuromorphic circuit for ex-situ training of multi-layer neural network algorithms", In 2015 International Joint Conference on Neural Networks (IJCNN) (pp. 1-7). IEEE.

K. K. Likharev, "CrossNets: Neuromorphic hybrid CMOS/nanoelectronic networks", Sci. Adv. Mater., vol. 3, pp. 322-331, Jun. 2011.

M. Prezioso, F. Merrikh-Bayat, B. D. Hoskins, G. C. Adam, K. K. Likharev, and D. B. Strukov, (2015). Training and operation of an integrated neuromorphic network based on metal-oxide memristors. Nature, 521(7550), 61-64.

V. Mnih, K. Kavukcuoglu, D. Silver, A. A. Rusu, J. Veness, M. G. Bellemare, A. Graves, M. Riedmiller, A. K. Fidjeland, G. Ostrovski, et al., "Human-level control through deep reinforcement learning," Nature, vol. 518, No. 7540, pp. 529-533, 2015.

Y. LeCun, et al. "Gradient-based learning applied to document recognition." Proceedings of the IEEE 86.11 (1998): 2278-2324.

Y. Wang, et al. "Low Power Convolutional Neural Networks on a Chip," ISCAS'2016.

* cited by examiner

FIG. 14

| | WEIGHT ASSIGNED TO INPUT VALUE IN EACH ROW | | |
|---|---|---|---|
| 1ST ROW | $W_{11} = w_{11}$<br>$W_{12} = w_{11}$<br>$W_{13} = w_{11} + w_{12}$<br>$W_{14} = w_{12}$<br>$W_{15} = w_{12} + w_{13}$<br>$W_{16} = w_{13}$<br>$W_{17} = w_{13}$ | 2ND ROW | $W_{21} = w_{11}$<br>$W_{22} = w_{11}$<br>$W_{23} = w_{11} + w_{12}$<br>$W_{24} = w_{12}$<br>$W_{25} = w_{12} + w_{13}$<br>$W_{26} = w_{13}$<br>$W_{27} = w_{13}$ |
| 3RD ROW | $W_{31} = w_{11} + w_{21}$<br>$W_{32} = w_{11} + w_{21}$<br>$W_{33} = w_{11} + w_{12} + w_{21} + w_{22}$<br>$W_{34} = w_{12} + w_{22}$<br>$W_{35} = w_{12} + w_{13} + w_{22} + w_{23}$<br>$W_{36} = w_{13} + w_{23}$<br>$W_{37} = w_{13} + w_{23}$ | | |
| 4TH ROW | $W_{41} = w_{21}$<br>$W_{42} = w_{21}$<br>$W_{43} = w_{21} + w_{22}$<br>$W_{44} = w_{22}$<br>$W_{45} = w_{22} + w_{23}$<br>$W_{46} = w_{23}$<br>$W_{47} = w_{23}$ | | |
| 5TH ROW | $W_{51} = w_{21} + w_{31}$<br>$W_{52} = w_{21} + w_{31}$<br>$W_{53} = w_{21} + w_{22} + w_{31} + w_{32}$<br>$W_{54} = w_{22} + w_{32}$<br>$W_{55} = w_{22} + w_{23} + w_{32} + w_{33}$<br>$W_{56} = w_{23} + w_{33}$<br>$W_{57} = w_{23} + w_{33}$ | | |
| 6TH ROW | $W_{61} = w_{31}$<br>$W_{62} = w_{31}$<br>$W_{63} = w_{31} + w_{32}$<br>$W_{64} = w_{32}$<br>$W_{65} = w_{32} + w_{33}$<br>$W_{66} = w_{33}$<br>$W_{67} = w_{33}$ | 7TH ROW | $W_{71} = w_{31}$<br>$W_{72} = w_{31}$<br>$W_{73} = w_{31} + w_{32}$<br>$W_{74} = w_{32}$<br>$W_{75} = w_{32} + w_{33}$<br>$W_{76} = w_{33}$<br>$W_{77} = w_{33}$ |

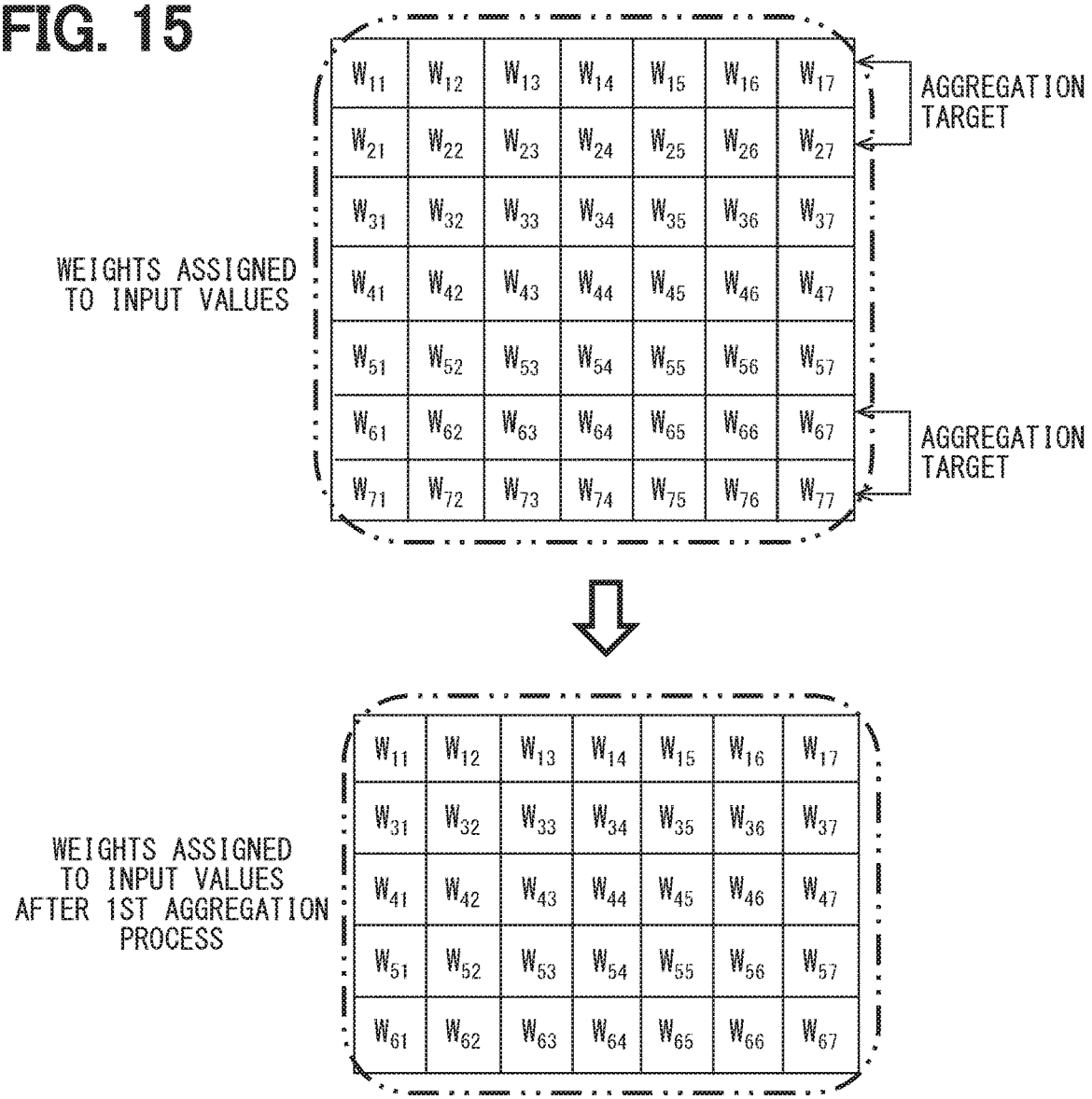

FIG. 17

| | INPUT VALUES AFTER 1ST AGGREGATION PROCESS |
|---|---|
| 1ST ROW | $I_{11} = i_{11} + i_{21}$<br>$I_{12} = i_{12} + i_{22}$<br>$I_{13} = i_{13} + i_{23}$<br>$I_{14} = i_{14} + i_{24}$<br>$I_{15} = i_{15} + i_{25}$<br>$I_{16} = i_{16} + i_{26}$<br>$I_{17} = i_{17} + i_{27}$ |
| 2ND ROW | $I_{31} = i_{31}$<br>$I_{32} = i_{32}$<br>$I_{33} = i_{33}$<br>$I_{34} = i_{34}$<br>$I_{35} = i_{35}$<br>$I_{36} = i_{36}$<br>$I_{37} = i_{37}$ |
| 3RD ROW | $I_{41} = i_{41}$<br>$I_{42} = i_{42}$<br>$I_{43} = i_{43}$<br>$I_{44} = i_{44}$<br>$I_{45} = i_{45}$<br>$I_{46} = i_{46}$<br>$I_{47} = i_{47}$ |
| 4TH ROW | $I_{51} = i_{51}$<br>$I_{52} = i_{52}$<br>$I_{53} = i_{53}$<br>$I_{54} = i_{54}$<br>$I_{55} = i_{55}$<br>$I_{56} = i_{56}$<br>$I_{57} = i_{57}$ |
| 5TH ROW | $I_{61} = i_{61} + i_{71}$<br>$I_{62} = i_{62} + i_{72}$<br>$I_{63} = i_{63} + i_{73}$<br>$I_{64} = i_{64} + i_{74}$<br>$I_{65} = i_{65} + i_{75}$<br>$I_{66} = i_{66} + i_{76}$<br>$I_{67} = i_{67} + i_{77}$ |

FIG. 18

| | WEIGHT ASSIGNED TO INPUT VALUE IN EACH COLUMN AFTER 1ST AGGREGATION PROCESS | | |
|---|---|---|---|
| 1ST COLUMN | $W_{11} = w_{11}$<br>$W_{31} = w_{11} + w_{21}$<br>$W_{41} = w_{21}$<br>$W_{51} = w_{21} + w_{31}$<br>$W_{61} = w_{31}$ | 2ND COLUMN | $W_{12} = w_{11}$<br>$W_{32} = w_{11} + w_{21}$<br>$W_{42} = w_{21}$<br>$W_{52} = w_{21} + w_{31}$<br>$W_{62} = w_{31}$ |
| 3RD COLUMN | $W_{13} = w_{11} + w_{12}$<br>$W_{33} = w_{11} + w_{12} + w_{21} + w_{22}$<br>$W_{43} = w_{21} + w_{22}$<br>$W_{53} = w_{21} + w_{22} + w_{31} + w_{32}$<br>$W_{63} = w_{31} + w_{32}$ | | |
| 4TH COLUMN | $W_{14} = w_{12}$<br>$W_{34} = w_{12} + w_{22}$<br>$W_{44} = w_{22}$<br>$W_{54} = w_{22} + w_{32}$<br>$W_{64} = w_{32}$ | | |
| 5TH COLUMN | $W_{15} = w_{12} + w_{13}$<br>$W_{35} = w_{12} + w_{13} + w_{22} + w_{23}$<br>$W_{45} = w_{22} + w_{23}$<br>$W_{55} = w_{22} + w_{23} + w_{32} + w_{33}$<br>$W_{65} = w_{32} + w_{33}$ | | |
| 6TH COLUMN | $W_{16} = w_{13}$<br>$W_{36} = w_{13} + w_{23}$<br>$W_{46} = w_{23}$<br>$W_{56} = w_{23} + w_{33}$<br>$W_{66} = w_{33}$ | 7TH COLUMN | $W_{17} = w_{13}$<br>$W_{37} = w_{13} + w_{23}$<br>$W_{47} = w_{23}$<br>$W_{57} = w_{23} + w_{33}$<br>$W_{67} = w_{33}$ |

FIG. 21

| | INPUT VALUES AFTER 2ND AGGREGATION PROCESS |
|---|---|
| 1ST COLUMN | $I'_{11} = I_{11} + I_{12} = i_{11} + i_{21} + i_{12} + i_{22}$<br>$I'_{31} = I_{31} + I_{32} = i_{31} + i_{32}$<br>$I'_{41} = I_{41} + I_{42} = i_{41} + i_{42}$<br>$I'_{51} = I_{51} + I_{52} = i_{51} + i_{52}$<br>$I'_{61} = I_{61} + I_{62} = i_{61} + i_{71} + i_{62} + i_{72}$ |
| 2ND COLUMN | $I'_{13} = I_{13} = i_{13} + i_{23}$<br>$I'_{33} = I_{33} = i_{33}$<br>$I'_{43} = I_{43} = i_{43}$<br>$I'_{53} = I_{53} = i_{53}$<br>$I'_{63} = I_{63} = i_{63} + i_{73}$ |
| 3RD COLUMN | $I'_{14} = I_{14} = i_{14} + i_{24}$<br>$I'_{34} = I_{34} = i_{34}$<br>$I'_{44} = I_{44} = i_{44}$<br>$I'_{54} = I_{54} = i_{54}$<br>$I'_{64} = I_{64} = i_{64} + i_{74}$ |
| 4TH COLUMN | $I'_{15} = I_{15} = i_{15} + i_{25}$<br>$I'_{35} = I_{35} = i_{35}$<br>$I'_{45} = I_{45} = i_{45}$<br>$I'_{55} = I_{55} = i_{55}$<br>$I'_{65} = I_{65} = i_{65} + i_{75}$ |
| 5TH COLUMN | $I'_{16} = I_{16} + I_{17} = i_{16} + i_{26} + i_{17} + i_{27}$<br>$I'_{36} = I_{36} + I_{37} = i_{36} + i_{37}$<br>$I'_{46} = I_{46} + I_{47} = i_{46} + i_{47}$<br>$I'_{56} = I_{56} + I_{57} = i_{56} + i_{57}$<br>$I'_{66} = I_{66} + I_{67} = i_{66} + i_{76} + i_{67} + i_{77}$ |

CONVOLUTIONAL NEURAL NETWORK

CROSS REFERENCE TO RELATED APPLICATIONS

The present application is a continuation application of International Patent Application No. PCT/JP2018/020712 filed on May 30, 2018 which designated the U. S. and claims the benefit of priority from Japanese Patent Application No. 2017-133046 filed on Jul. 6, 2017. The entire disclosures of all of the above applications are incorporated herein by reference.

TECHNICAL FIELD

The present disclosure relates to a convolutional neural network including a convolution layer and a pooling layer.

BACKGROUND

Use of a deep neural network and a deep learning algorithm may provide the recognition performance highly superior the recognition performance using the conventional machine learning in the field of image recognition, for example. Generally, a convolutional neural network is used as the deep neural network. The convolutional neural network repeats convolution and pooling on a local region (filter) to extract a feature and transmits the feature to an output layer via a fully connected layer. From the output layer, for example, the softmax function is used to output an output value representing the probability belonging to each class to be classified.

SUMMARY

The present disclosure describes a convolutional neural network including a first convolution layer, a pooling layer, a second convolution layer, a cross bar circuit, and a control portion that selects from convolution operation results of the first convolution layer, an input value needed to acquire each pooling operation result needed to perform the second filter convolution operation at each shift position, in the second convolution layer, and inputs the input value selected to input bars of the cross bar circuit.

BRIEF DESCRIPTION OF DRAWINGS

Objects, features, and advantages of the present disclosure will become more apparent from the following detailed description with reference to the accompanying drawings. In the drawings:

FIG. 14 is a diagram illustrating a result of representing weights corresponding to input values in the rows included in the filter range by use of weights applied by the filter to a target range of each pooling operation;

FIG. 15 is a diagram illustrating a first aggregation process that aggregates a plurality of rows having the same weight into one row as an aggregation target;

FIG. 16 is a diagram illustrating input values belonging to a range after the first aggregation process aggregates a plurality of rows having the same weight into one row;

FIG. 17 is a diagram illustrating a result of representing input values illustrated in FIG. 16 by using original input values input to a first pooling layer;

FIG. 18 is a diagram illustrating a result of representing weights corresponding to input values in the columns after the first aggregation process by use of weights applied by the filter to a target range of each pooling operation;

FIG. 21 is a diagram illustrating a result of representing input values illustrated in FIG. 20 by using original input values input to the first pooling layer;

DETAILED DESCRIPTION

Figure 1:
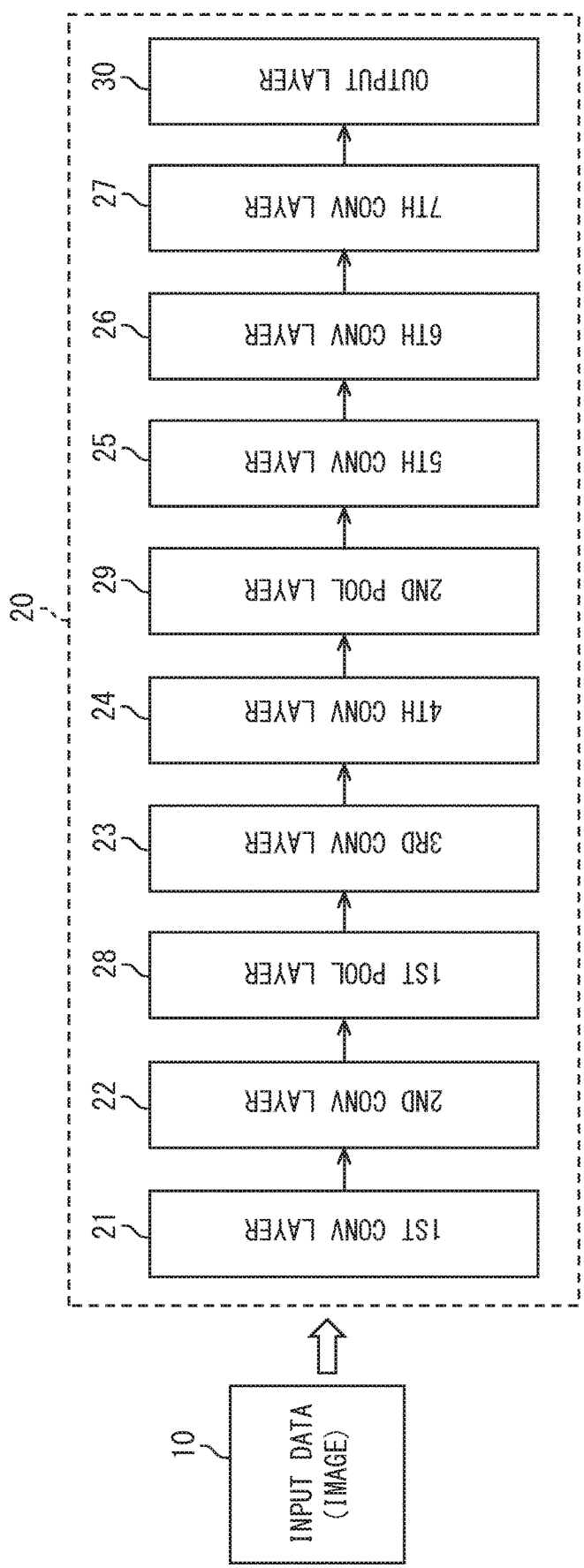
FIG. 1 is a diagram conceptually illustrates an example configuration of the convolutional neural network according to an embodiment.

The use of a deep neural network and a deep learning algorithm may provide the recognition performance highly superior the recognition performance using the conventional machine learning in the field of image recognition, for example. A convolutional neural network may be used as the deep neural network. The convolutional neural network repeats convolution and pooling on a local region (filter) to extract a feature and transmits the feature to an output layer via a fully connected layer. From the output layer, for example, the softmax function is used to output an output value representing the probability belonging to each class to be classified.

The convolutional neural network repeats operations such as addition, multiplication, and division for convolution or pooling. A vast amount of operation load may be needed and the power consumption may increase when CPU or GPU is used for operations in the convolutional neural network.

A dedicated hardware circuit is under development to efficiently perform the operations. Examples of the hardware circuit include a crossbar circuit using resistive random access memory (memristor) that can be set to different resistance states depending on applied voltages or currents as described in a related art, for example.

The crossbar circuit includes many input bars and output bars intersecting with each other. The input bar and the output bar are connected at each intersection point via the memristor. When a voltage signal corresponding to an input value is input to the input bar of the crossbar circuit, each voltage signal is multiplied by a conductance as a weight provided by the memristor and then is integrated with the output bar. Therefore, the crossbar circuit can perform the convolution operation by allowing each memristor to include the conductance corresponding to the weight of each element of a filter on a given convolution layer in the convolutional neural network, for example. The input bar may be referred to as an input line, and the output bar may be referred to as an output line.

Major techniques for the above-described pooling include the max pooling and the average pooling. The max pooling selects the maximum value in a plurality of convolution operation results included in a pooling range. The average pooling calculates an average value of the convolution operation results. Recently, the max pooling is mainstream because easy operations are available on digital circuits such as CPU and GPU and the convolutional neural network can accelerate learning. The crossbar circuit may perform only convolution operations and the digital circuit may perform the other processes including pooling operations for the max pooling.

Meanwhile, the average pooling is comparable to the max pooling in terms of the recognition performance. A pooling operation for the average pooling can be performed in an analog region of the crossbar circuit by equalizing all weights provided by the conductance of the memristor as above.

According to a related art, an output value (convolution operation result) from a crossbar circuit to perform the convolution operation is input to a crossbar circuit to perform the pooling operation. A crossbar circuit in a related art is provided to be specialized for the pooling operation. Therefore, an increase in the number of crossbar circuits may enlarge an area for the crossbar circuits or increase the power consumption.

The present disclosure may provide a convolutional neural network capable of decreasing a crossbar circuit area and power consumption.

According to one aspect of the present disclosure, a convolutional neural network may include: a first convolution layer that shifts a first filter having a predetermined size in a predetermined stride in a two-dimensional direction to target input data including input values arrayed two-dimensionally, and performs a first filter convolution operation at each shift position with the first filter to obtain convolution operation results; a pooling layer that performs a pooling operation on each pooling range of input values comparable to the convolution operation results arrayed two-dimensionally, obtaining pooling operation results; a second convolution layer that shifts a second filter having a predetermined size in a predetermined stride in a two-dimensional direction to target input values comparable to the pooling operation results arrayed two-dimensionally, and performs a second filter convolution operation at each shift position; a crossbar circuit that includes a plurality of input bars, at least one output bar intersecting with the input bars, and a plurality of weight assignment elements that are provided at intersection points between the input bars and the output bar, weights each input value input to the input bars to output to the output bar; and a control portion that selects from the convolution operation results of the first convolution layer, an input value needed to acquire each pooling operation result needed to perform the second filter convolution operation at each shift position, in the second convolution layer, and inputs the input value selected to the input bars. The crossbar circuit supplies the input values input to the input bars with the weight corresponding to a position in the second filter for the pooling operation result operated from each of the input values, adds the weighted input values by the output bar, and outputs an output result from the output bar. The convolutional neural network further comprises a divider portion that sets the output value output from the output bar to a value obtained through division by a total number of the convolution operation results included in the pooling range. The crossbar circuit simultaneously performs (i) an average pooling operation on the convolution operation results from the first convolution layer and (ii) the second filter convolution operation on a result of the average pooling operation.

According to the configuration, the convolutional neural network according to the present disclosure allows the crossbar circuit to simultaneously perform the average pooling operation on a convolution operation result from the first convolution layer and the second filter convolution operation on a result of the average pooling operation. There is no need to provide a crossbar circuit dedicated to the pooling operation, making it possible to greatly reduce a circuit area for the crossbar circuit and power consumption.

First Embodiment

The description below explains the first embodiment of the convolutional neural network according to the present disclosure with reference to the accompanying drawings. The embodiment below describes an example applied to the use of classifying images as input data into a plurality of categories. The convolutional neural network can apply to the other uses. For example, the convolutional neural network can be applied to detect an object or a person appearing in a captured image or recognize a human face or a road sign, or the like. The convolutional neural network may be implemented as an image recognition system.

FIG. 1 conceptually illustrates the structure of a convolutional neural network 20 according to the present embodiment. The convolutional neural network 20 is basically structured to alternately connecting convolution layers and pooling layers. According to the example in FIG. 1, the convolutional neural network 20 includes seven convolution layers such as a first convolution layer 21, a second convolution layer 22, a third convolution layer 23, a fourth convolution layer 24, a fifth convolution layer 25, a sixth convolution layer 26, and a seventh convolution layer 27. A first pooling layer 28 is provided between the second convolution layer 22 and the third convolution layer 23. A second pooling layer 29 is provided between the fourth convolution layer 24 and the fifth convolution layer 25.

The pooling layer is not necessarily connected next to the convolution layer in the convolutional neural network 20. The pooling layer may be connected after a plurality of the convolution layers are connected. The number of layers such as the convolution layers 21 through 27 and the pooling layers 28 and 29 is not limited to the example in FIG. 1. Generally, an increase in the number of layers such as the convolution layers 21 through 27 and the pooling layers 28 and 29 may improve the recognition performance.

Input data (for example, an image or an image data) 10 is input to the first through seventh convolution layers 21 through 27 that each operate to convolute a filter into the input data 10. The filter has a predetermined size (such as 3×3 or 5×5) corresponding to each of the convolution layers 21 through 27. An image as the input data 10 includes a two-dimensionally arrayed input value (pixel value). The filter convolution operation in each of the convolution layers 21 through 27 is basically the same as filter convolution in ordinary image processing such as two-dimensionally convoluting a small-sized image (filter) into an input image to blur the image or emphasize edges. Specifically, the first through seventh convolution layers 21 through 27 perform the convolution operation by integrating each of multiplication results acquired by multiplying each pixel value (weight) of a small-sized image as the filter by each pixel value of a region sized equally to the filter in an image as the input data 10. When the input data 10 includes a plurality of input images, the same filter is used to perform the convolution operation in the same region of the input images. Results from the convolution operations are further integrated. The calculated integration results are output as output values corresponding to the filter positions in the convolution layers 21 through 27 via an activation function such as ReLU or tanh.

The learning determines a filter weight. The present embodiment performs supervised learning after the convolutional neural network 20 is built on a computer. The learning is also targeted at the size of weight corresponding to a bias input as well as the above-mentioned filter weight. When the learning terminates, the learned value is assigned to a crossbar circuit.

Figure 2:
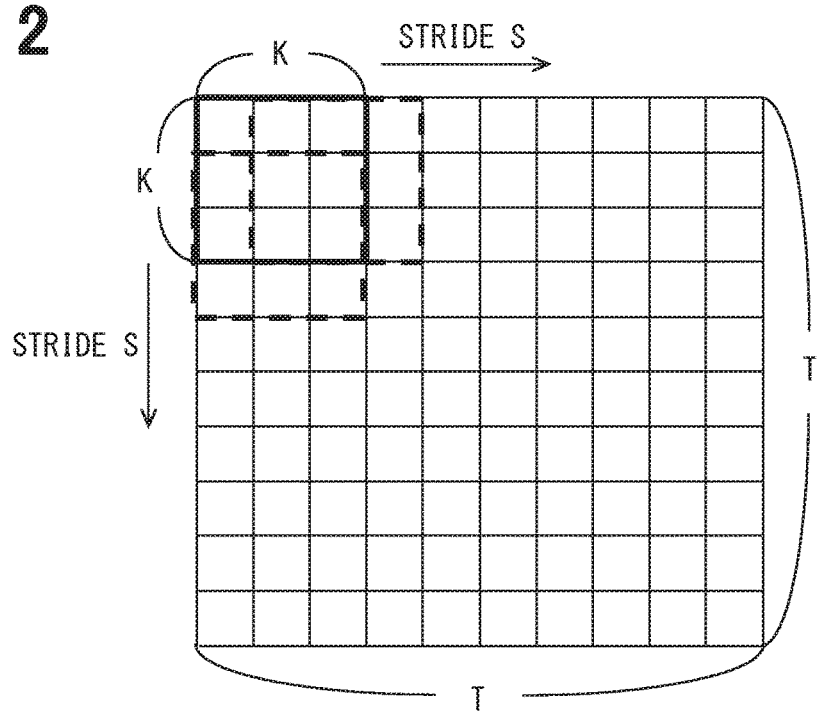
FIG. 2 is a diagram illustrating filter convolution operation.
Figure 3:
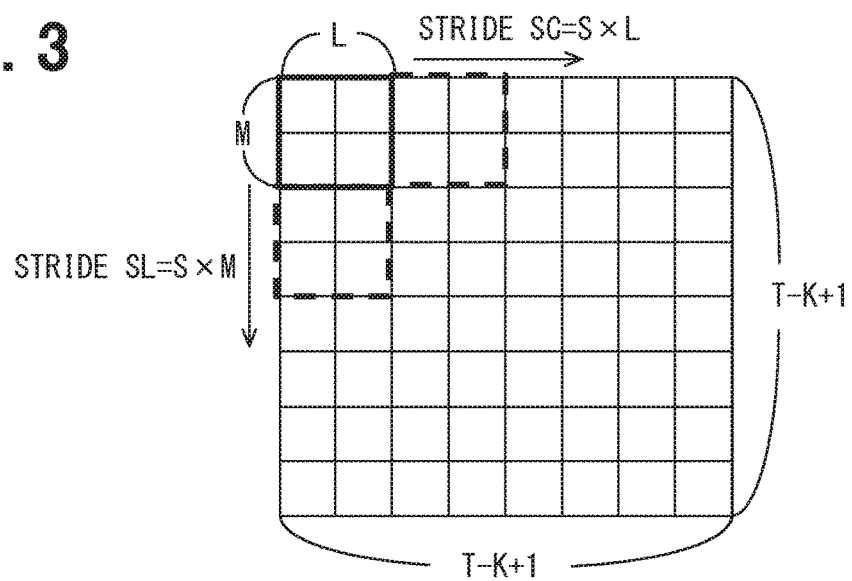
FIG. 3 is a diagram illustrating pooling operation on a convolution operation result.

As illustrated in FIG. 2, for example, the filter used for each of the first through seventh convolution layers 21 through 27 is shifted on the input image in a two-dimensional direction in predetermined stride S. The above-described convolution operation is performed at each shifted position. Each of the convolution layers 21 through 27 generates an output value corresponding to the shift position of each filter all over the input image. The output values are two-dimensionally aggregated to correspond to shift positions of the filter. The result equals output data from each of the convolution layers 21 through 27. FIG. 3 illustrates an example of the output data. The example in FIG. 3 shows that the size of output data from the convolution layers 21 through 27 is [T-K+1]×[T-K+1] after reducing the original size (T×T) of the input data by the filter size (K×K).

Output data from the convolution layers 21 through 27 is formed as a two-dimensionally arranged image and is generally referred to as a feature map. Feature maps are generated as many as the filters used for the convolution layers 21 through 27. Therefore, input data containing a plurality of input images (feature maps) is normally supplied to the second convolution layer 22 and later, namely, the convolution layers 22 through 27. When a color image is input, even the first convolution layer 21 is supplied with three images corresponding to RGB. When a grayscale image is input, the first convolution layer 21 is supplied with only one image.

The present embodiment configures the sixth and seventh convolution layers 26 and 27 to use a filter sized to 1×1. The sixth and seventh convolution layers 26 and 27 perform a 1×1 convolution operation that multiplies a filter-derived weight by a pixel value at the same position in each input image and adds the pixel values. A fully connected layer can be used for the sixth and seventh convolution layers 26 and 27. The present embodiment uses a crossbar circuit to perform the convolution operation on the convolution layers 21 through 27 including the sixth and seventh convolution layers 26 and 27 in an analog region and therefore uses the convolution layer to perform the 1×1 convolution operation as above. The use of the fully connected layer may excessively increase the number of input bars, making it difficult to use one crossbar circuit as a solution. The crossbar circuit will be described later in detail.

The first and second pooling layers 28 and 29 discard part of the information representing high compatibility between the filter and positions in an input image, thereby improve invariance against positional change in a feature appearing in the input image and reduce the image size to possibly reduce the amount of calculation later on.

Figure 4:
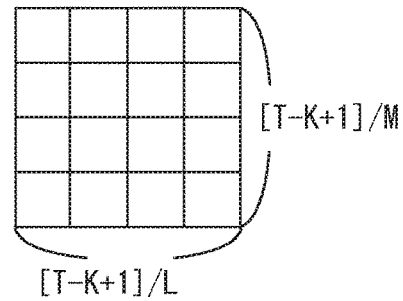
FIG. 4 is a diagram illustrating a pooling operation result.

Specifically, as illustrated in FIG. 3, the first and second pooling layers 28 and 29 provide a window having a specified size L×M (such as 2×2 or 3×3) for an input image. A plurality of input values (pixel values) in the input image are merged by averaging input values (pixel values) in the window (average pooling) or using a maximum one of the input values (pixel values) in the window (max pooling). The pooling operation often shifts the window to avoid an overlap between windows that define pooling target ranges. The example in FIG. 3 illustrates a window using stride SC having the size of S×L in the row direction and stride SL having the size of S×M in the column direction. As a result, the pooling layer 28 or 29 outputs an image whose size is reduced to the window size (L×M) as illustrated in FIG. 4. For example, when the window size is 2×2 and is shifted in the stride of two pixels to avoid a window overlap, the pooling reduces the input image size by ¼. However, the window may be shifted in the row and/or column direction to allow partial overlap between windows that settle a range of pooling operation. The pooling operation is performed corresponding to each input image (feature map). The number of input images is unchanged before and after the pooling operation.

An image output from the pooling layers 28 and 29 is used as an input image to the succeeding convolution layers 23 and 25. The convolution layers 23 and 25 perform the filter convolution operation on the input image as described by use of FIG. 2.

In the present embodiment, the crossbar circuit 44 simultaneously performs the pooling operation in at least one of the first and second pooling layers 28 and 29 and the convolution operation in the succeeding convolution layers 23 and 25. This will be described in detail later. The average pooling is performed in an analog region by use of the crossbar circuit and is employed as a pooling operation performed simultaneously with the convolution operation.

An output layer 30 outputs a probability of causing an image as input data 10 to belong to each of the categories to be classified based on the normalization by use of the softmax function, for example. The image as the input data 10 can be classified into the categories by the selection of a category corresponding to the highest probability output from the output layer 30.

Figure 5:
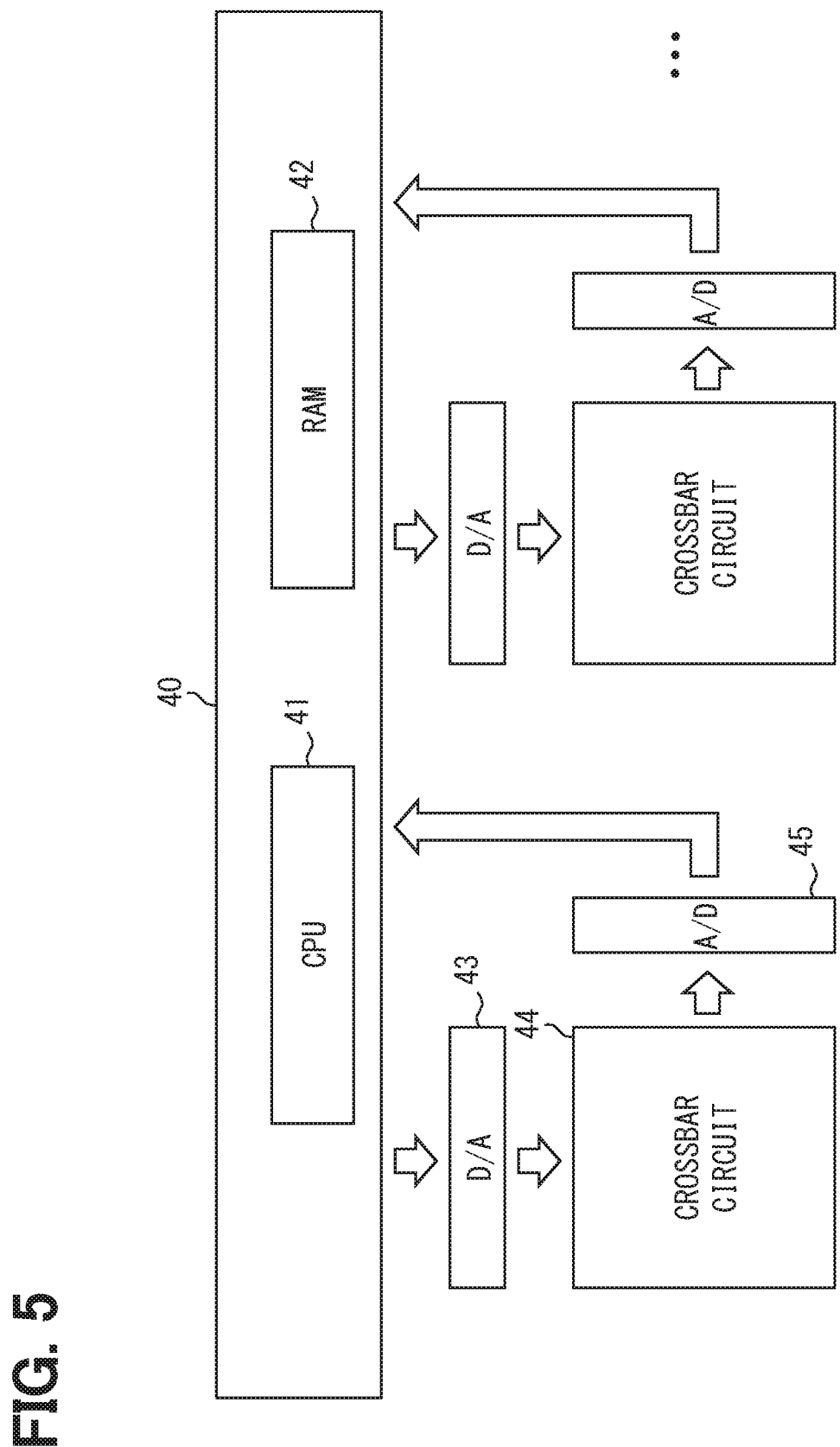
FIG. 5 is a configuration diagram illustrating a configuration of the convolutional neural network in FIG. 1 by use of a crossbar circuit.

The description below explains a configuration to embody the convolutional neural network 20 configured as above by use of a crossbar circuit with reference to FIG. 5. As illustrated in FIG. 5, the present embodiment mainly includes a microcomputer 40, a D/A converter circuit 43, a crossbar circuit 44, and an A/D converter circuit 45 as component elements to embody the convolutional neural network 20.

Figure 6:
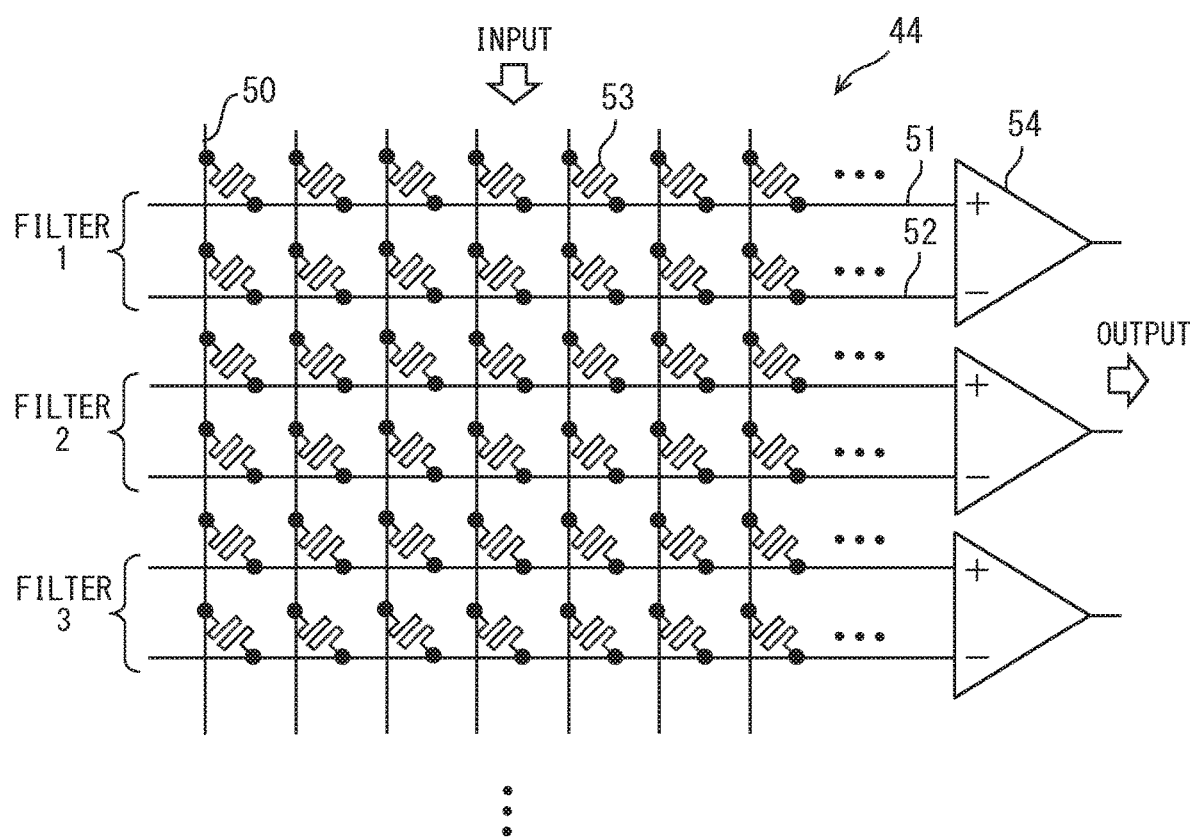
FIG. 6 is a diagram illustrating the crossbar circuit.

The description below explains the crossbar circuit 44 based on FIGS. 6 through 8. As illustrated in FIG. 6, the crossbar circuit 44 includes a plurality of input bars 50, a plurality of output bars 51 and 52, a plurality of memristors 53 as weight assignment elements, and a plurality of differential operational amplifiers 54.

The microcomputer 40 supplies the input bars 50 with an input signal (also referred to as voltage signal) corresponding to each pixel value in a region sized equally to the above-mentioned filter in the input image. The output bars 51 and 52 are placed to intersect with the input bars 50.

Figure 7:
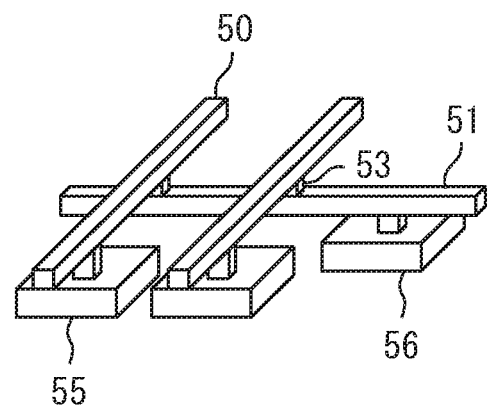
FIG. 7 is another diagram illustrating the crossbar circuit.

As illustrated in FIG. 7, for example, the input bars 50 and the output bars 51 and 52 can be formed on a CMOS substrate where a CMOS element is formed. In this case, the input bar 50 is supplied with the voltage signal corresponding to the above-mentioned pixel value via an input neuron 55 comprised of a CMOS element. An intersection point between the input bar 50 and the output bar 51 is provided with the memristor 53 as a weight assignment element. The input bar 50 and the output bar 51 are connected via the memristor 53.

The memristor 53 signifies resistive random access memory that can be set to different resistance states between the minimum and maximum values depending on applied voltages or currents. For example, a not-shown voltage application circuit can be used to increase the conductance of the memristor 53 by applying a negative write voltage and decrease the conductance of the memristor by applying a positive write voltage. The memristor 53 maintains the activated resistance state (conductance) unless a voltage exceeding the positive or negative write voltage is applied. Elements available for the memristor 53 include $Pt/TiO_2/Pt$ metal oxide element, phase change memory, and magnetic tunnel junction memory.

Figure 8:
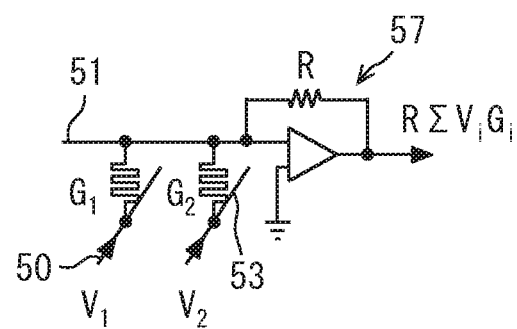
FIG. 8 is another diagram illustrating the crossbar circuit.

FIG. 8 illustrates an electric circuit representing the configuration in FIG. 7. As illustrated in FIG. 8, the CMOS element configuring an output neuron 56 connected to the output bar 51 forms an operational amplifier. Resistor R is connected between input and output of the operational amplifier to configure an adder. As illustrated in FIG. 8, the input neuron 55 supplies the input bars 50 with voltage signals V1 and V2 that are multiplied by conductances G1 and G2 from the memristor 53 and are then added in the adder connected to the output bar 51. The adder multiplies the addition result by R. As equation 1 below expresses, the output neuron 56 outputs a result found by integrating results of multiplying voltage signals V1, V2, and so on from the input bars 50 by conductances G1, G2, and so on from the memristor 53 and further multiplying the integration result by R.

$$\text{Output voltage from the output neuron} = R\Sigma ViGi \qquad \text{(Equation 1)}$$

As illustrated in FIG. 6, the output bar 51 is connected to a non-inverting input terminal of the differential operational amplifier 54 and the output bars 52 is connected to an inverting input terminal of the differential operational amplifier 54. The differential operational amplifier 54 can be configured by the use of a CMOS element on the CMOS substrate. FIG. 6 omits the adder in FIG. 8. Moreover, FIG. 6 omits the circuit to perform the process as the above-mentioned activation function. Actually, an adder 57 is provided for each of the output bars 51 and 52 at the input side of the differential operational amplifier 54. An activation function processing circuit is provided at the output side of the differential operational amplifier 54. Integrated circuits configured by CMOS elements include the adder 57, the differential operational amplifier 54, and the activation function processing circuit.

According to the present embodiment, the output bars 51 and 52 are connected to the non-inverting input terminal and the inverting input terminal of the differential operational amplifier 54, respectively. A negative weight and a positive weight can be used as the filter to perform the convolution operation. When an input signal is multiplied by a positive weight, it just needs to set the conductance of the memristor 53 provided between the output bar 51 and the input bar 50 connected to the non-inverting input terminal to be larger than the conductance of the memristor 53 provided between the output bar 52 and the input bar 50 connected to the inverting input terminal by the positive weight to use. When an input signal is multiplied by a negative weight, it just needs to set the conductance of the memristor 53 provided between the output bar 52 and the input bar 50 connected to the inverting input terminal to be larger than the conductance of the memristor 53 provided between the output bar 51 and the input bar 50 connected to the non-inverting input terminal by the negative weight to use.

As illustrated in FIG. 6, the present embodiment configures two output bars 51 and 52 as a set and supplies the memristor 53 between the set of the output bars 51 and 52 and the input bar 50 with weights corresponding to the filters 1, 2, 3, and so on to be used for the pertinent convolution layers 21 through 27.

The microcomputer 40 mainly includes a CPU 41, RAM 42, and ROM (an example of non-transitory tangible storage medium) and performs various processes according to a program stored in the ROM, for example. A process targeted at the first convolution layer 21 will be described below. The microcomputer 40 performs a similar process on the other convolution layers 22 through 27 except a convolution layer that allows the same crossbar circuit 44 to simultaneously perform the convolution operation and the pooling operation.

The microcomputer 40 designates a region to perform the convolution operation on the filter in an image as the input data 10, and outputs a digital signal corresponding to a pixel value of each pixel contained in the region to the D/A converter circuit 43. The D/A converter circuit 43 outputs an analog signal (voltage signal) corresponding to each pixel value in the region to perform the convolution operation to the crossbar circuit 44.

The microcomputer 40 performs a process to incorporate output from the A/D converter circuit 45 at the timing when the arithmetic processing in the crossbar circuit 44 terminates to generate an output. Outputs are available after processed at specified positions of the filters by as many convolution operations and activation functions as the filters used for the first convolution layer 21. The A/D converter circuit 45 converts the outputs into digital signals, and outputs the digital signals. The microcomputer 40 classifies the digital signals output from the A/D converter circuit 45 into the filters and accordingly stores the digital signals in the RAM 42.

The microcomputer 40 shifts the region to perform the convolution operation on the filter by a specified stride in the input image, outputs a digital signal corresponding to the pixel value contained in the shifted region and performs a process similar to the above-described process. This process are repeated until completion of shifting the filters in all regions of the input image. The RAM 42 thereby stores digital data representing as many feature maps as the filters generated for the first convolution layer 21.

The description below will explain a configuration that allows the same crossbar circuit 44a to simultaneously perform the filter convolution operation in the convolution layers 23 and 25 and the pooling operation in the pooling layers 28 and 29 according to the present embodiment. The configuration described below is applied to at least one of a set of the third convolution layer 23 and the first pooling layer 28 and a set of the fifth convolution layer 25 and the second pooling layer 29. For convenience sake, the description below explains an example of the configuration that simultaneously performs the pooling operation and the filter convolution operation on the third convolution layer 23 and the first pooling layer 28.

Figure 9:
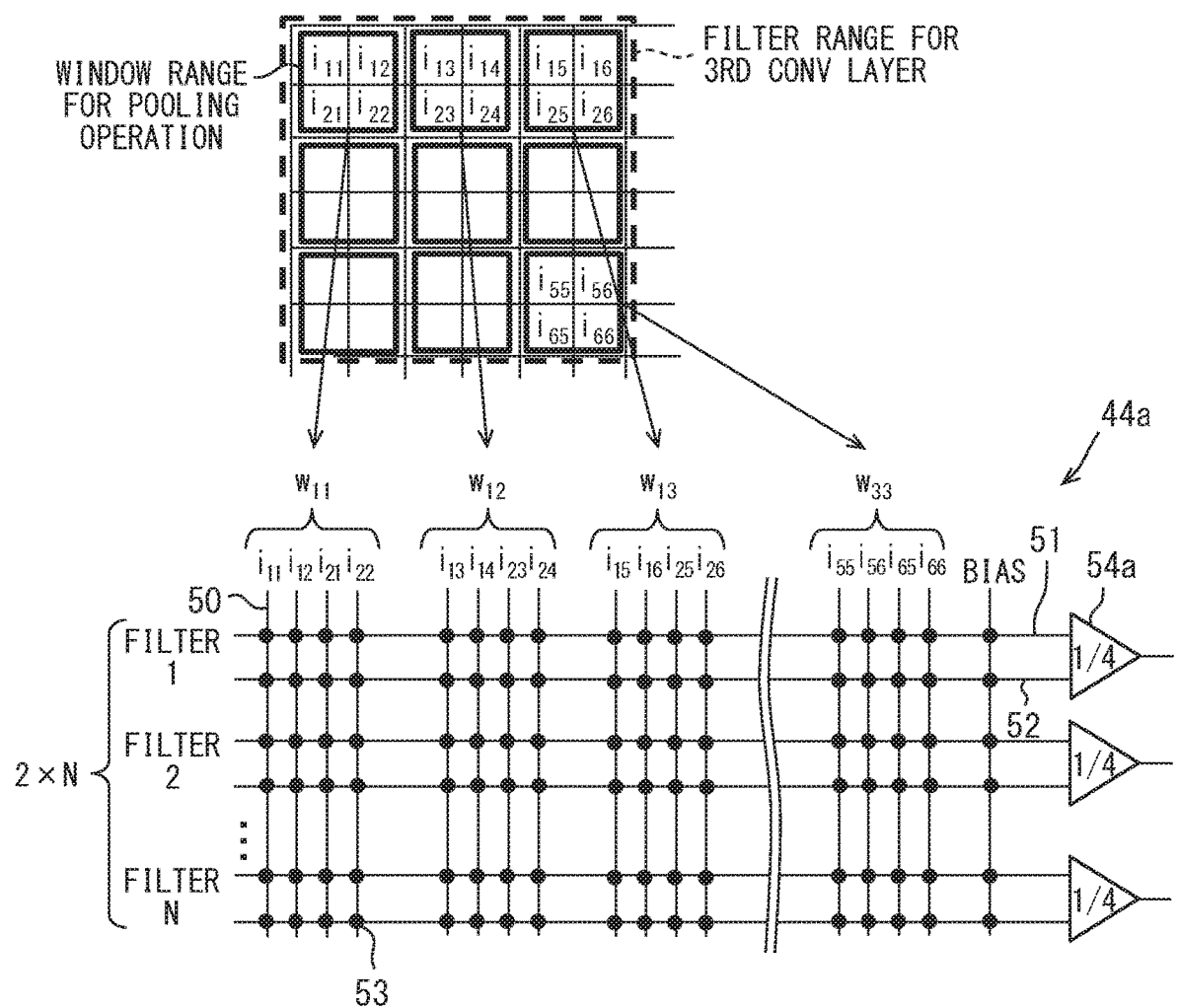
FIG. 9 is a diagram illustrating a configuration according to a first embodiment to perform the pooling operation and the filter convolution operation by using the same crossbar circuit.

According to the present embodiment, as illustrated in FIG. 9, the microcomputer 40 selects all necessary input values from output data output from the second convolution layer 22 preceding the first pooling layer 28. The input values are needed to acquire pooling operation results needed for the convolution operation on a pertinent filter at each shift position of the filter in the third convolution layer 23 succeeding the first pooling layer 28. The microcomputer 40 supplies the selected input values to the discrete input bars 50.

The example in FIG. 9 illustrates the window range of 2×2 to settle a pooling operation target. As illustrated in FIG. 9, this window is shifted in the row direction and the column direction to avoid an overlap with the adjacent windows. For example, four input values $i_{11}$, $i_{12}$, $i_{21}$, and $i_{22}$ belong to the top-left window range. An average of the four input values $i_{11}$, $i_{12}$, $i_{21}$, and $i_{22}$ equals a pooling operation result in the top-left window range.

The example in FIG. 9 illustrates the filter size of 3×3 for the third convolution layer 23. Therefore, in FIG. 9, the filter range contains nine windows to settle a pooling operation target.

The crossbar circuit 44a includes as many input bars 50 as possible to input all the selected input values. According to the example in FIG. 9, when the window to settle a range of pooling operation targets is sized as L×M and the filter is sized as K×K, the number of input bars 50 is calculated as (K×K)×(L×M)+1. When a plurality of input images are supplied correspondingly, the number of input bars 50 is multiplied by the number of input images.

The third convolution layer includes a plurality of filters (1 through N). The crossbar circuit 44a includes as many output bars 51 and 52 (2×N) as the number of filters N. The memristor 53 for the crossbar circuit 44a is assigned with the conductance corresponding to the weight of each filter on a filter basis. The conductance corresponding to the same weight is assigned to input values belonging to the same window range. For example, FIG. 9 illustrates that a given filter is assigned with the conductance corresponding to weight $W_{11}$ for input values $i_{11}$, $i_{12}$, $i_{21}$, and $i_{22}$, weight $W_{12}$ for input values $i_{13}$, $i_{14}$, $i_{23}$, and $i_{24}$, weight $W_{13}$ for input values $i_{15}$, $i_{16}$, $i_{25}$, and $i_{26}$, and weight $W_{33}$ for input values $i_{55}$, $i_{56}$, $i_{65}$, and $i_{66}$.

The present embodiment provides input values belonging to each window range for the pooling operation with the shared weight corresponding to the position in each window in the filter. Input values belonging to the same window range are given the shared weight and are output to the output bars 51 and 52, providing an effect comparable to applying the same weight to the sum of the input values.

Each differential operational amplifier 54a provided for the crossbar circuit 44a includes the function as a divider portion that divides a result of the filter convolution operation on input values input to the input bar 50 by the size (L×M) of a window to settle a target range for the pooling operation. According to the example in FIG. 9, the window size is 2×2 and, therefore, a differential operation result is multiplied by ¼. The function as the divider portion averages the sum of input values that are input to the input bars 50 and are included in the target range for each pooling operation. The crossbar circuit 44a outputs a result of the average pooling operation in the first pooling layer 28 on output data from the second convolution layer 22 and the filter convolution operation in the third convolution layer 23 on the pooling operation result.

However, each differential operational amplifier 54a may exclude the function as the divider portion that multiplies a differential operation result by 1/(L×M). For example, the function may be given to the microcomputer 40 that receives output data from the crossbar circuit 44a. The microcomputer 40 may perform the division by using digital operations. Alternatively, each memristor 53 of the crossbar circuit 44a may be given a correction weight resulting from dividing a learned weight by the number of convolution operation results included in a pooling range. Each memristor 53 thereby provides the function as the divider portion. When the microcomputer 40 provides the function as the divider portion, each input value may be modified to a value resulting from dividing each input value by the number of convolution operation results included in the pooling range before the microcomputer 40 supplies each input value to the input bar 50 of the crossbar circuit 44a. The modified input value may be input to the crossbar circuit 44a.

The crossbar circuit 44a is configured as above. The microcomputer 40 selects all input values needed to acquire each pooling operation result needed for the filter convolution operation at each shift position of the filter in the third convolution layer 23 from the output data output from the second convolution layer 22. The microcomputer 40 inputs the selected input values to the discrete input bars 50. The crossbar circuit 44a then simultaneously performs the average pooling operation and the filter convolution operation at each shift position. There is no need to provide the memory such as RAM to temporarily store pooling operation results or a dedicated crossbar circuit to perform the pooling operation. As a result, it is possible to greatly reduce a circuit area for the crossbar circuit or the power consumption.

Figure 10:
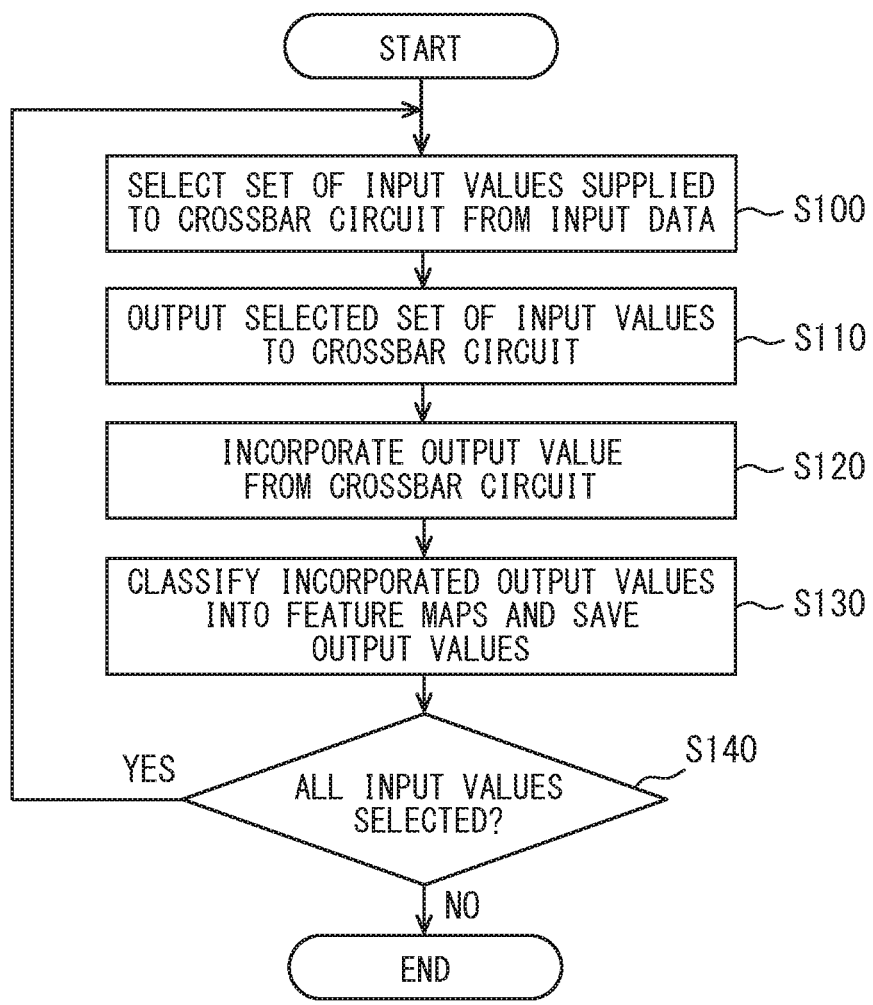
FIG. 10 is a flowchart illustrating a process performed by a microcomputer to simultaneously perform the pooling operation and the filter convolution operation in the crossbar circuit according to the first embodiment.

Based on a flowchart in FIG. 10, the description below explains a process performed by the microcomputer 40 to simultaneously perform the pooling operation and the filter convolution operation at each shift position in the crossbar circuit 44a.

In S100, the process selects a set of input values (pixel values) to be input to the input bar 50 of the crossbar circuit 44a from an input image. As above, the selection of a set of input values selects all input values needed to acquire each pooling operation result needed for the filter convolution operation at each shift position of the filter in the third convolution layer 23 succeeding the first pooling layer 28 from the output data output from the second convolution layer 22 preceding the first pooling layer 28.

In S110, the process outputs the set of selected input values to the crossbar circuit 44a. The D/A converter circuit 43 converts a digital signal corresponding to each output set of input values into an analog signal and inputs the analog signal to the crossbar circuit 44a. Each memristor 53 of the crossbar circuit 44a is provided with the conductance comparable to the weight of each filter.

In S120, the microcomputer 40 incorporates the output value from the crossbar circuit 44a. Specifically, the A/D converter circuit 45 converts the analog signal output from the crossbar circuit 44a into a digital signal. The microcomputer 40 incorporates the converted digital signal. Outputs are available after processed at specified positions of the filters by as many convolution operations and average pooling operations as the filters used for the convolution layers 23 and 25. The A/D converter circuit 45 converts the outputs into digital signals and outputs the digital signals. In S130, the microcomputer 40 classifies the digital signals output from the A/D converter circuit 45 into the filters and accordingly stores the digital signals in the RAM 42. In S140, the process shifts the filter to cover the entire range of the input image and determines whether all sets of input values are completely selected. If a set of unselected input values remains, control returns to S100 and the above-described process is repeated.

Second Embodiment

The description below explains the second embodiment of the convolutional neural network according to the present disclosure with reference to the accompanying drawings. A configuration to provide the convolutional neural network according to the present embodiment equals the configuration to provide the convolutional neural network according to the first embodiment. Therefore, a description of the configuration is omitted for simplicity.

Compared to the first embodiment, the present embodiment is characterized by being able to miniaturize a crossbar circuit that simultaneously performs the pooling operation and the filter convolution operation. Techniques to miniaturize the crossbar circuit will be explained below in detail. Also in the present embodiment, the description below explains an example of the configuration that simultaneously performs the pooling operation and the filter convolution operation on the third convolution layer 23 and the first pooling layer 28.

The first embodiment selects all input values needed to acquire each pooling operation result needed for the filter convolution operation at each shift position of the filter in the third convolution layer 23 succeeding the first pooling layer 28 from the output data output from the second convolution layer 22 preceding the first pooling layer 28. The selected input values are input to the input bar 50 of the crossbar circuit 44a. As above, the number of input bars 50 of the crossbar circuit 44a is calculated as (K×K)×(L×M)+1.

Similarly to the first embodiment, the present embodiment allows the microcomputer 40 to select input values to be input to the input bar 50 of a crossbar circuit 44b. However, the present embodiment differs from the first embodiment in that the microcomputer 40 previously calculates the sum of input values belonging to the same window range.

Figure 11:
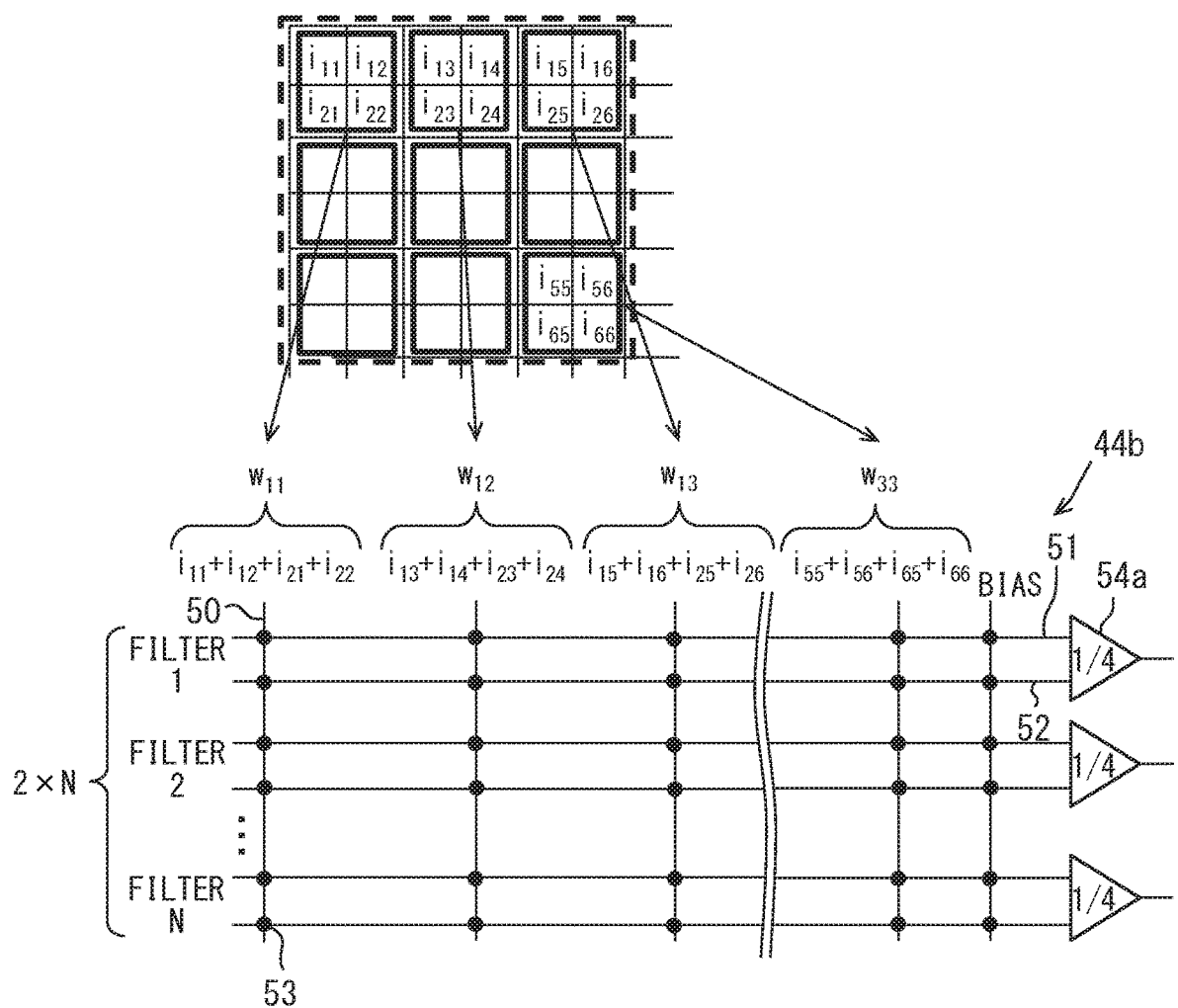
FIG. 11 is a diagram illustrating a configuration according to a second embodiment to perform the pooling operation and the filter convolution operation in the same crossbar circuit.

Specifically, as illustrated in FIG. 11, the sum of input values belonging to each window range is calculated in advance. The calculated sum is input to each input bar 50 of the crossbar circuit 44b. The present embodiment can greatly decrease the number of the input bars 50 for the crossbar circuit 44b compared to the first embodiment. Similarly to the first embodiment, when the window to settle a target range of pooling operation is sized as L×M and the filter is sized as K×K, the number of the input bars 50 is K×K+1 according to the present embodiment, enabling the reduction of approximately 1/(L×M) compared to the first embodiment.

In FIG. 11, each memristor 53 for the crossbar circuit 44b is assigned with the conductance corresponding to the weight of each filter. Each differential operational amplifier 54a connected to the output bars 51 and 52 outputs each convolution operation result on each filter. Similarly to the first embodiment, the differential operational amplifier 54a includes the function as a divider portion that divides a result of the filter convolution operation on each input value input to the input bar 50 by the size of a window to settle the target range for the pooling operation. Also according to the present embodiment, the crossbar circuit 44b outputs a result of performing both the average pooling operation in the first pooling layer 28 on output data from the second convolution layer 22 and the filter convolution operation in the third convolution layer 23 on the pooling operation result.

According to the example in FIG. 11, the differential operational amplifier 54a, as a divider portion, divides input values by the number of convolution operation results included in the pooling range. However, similarly to the first embodiment, the microcomputer 40, as a divider portion, receives output data from the crossbar circuit 44b and may divide each value included in the output data by the number of convolution operation results included in the pooling range. Alternatively, each memristor 53 of the crossbar circuit 44a may be given a correction weight resulting from dividing a learned weight by the number of convolution operation results included in a pooling range. Each memristor 53 thereby provides the function as the divider portion.

Figure 12:
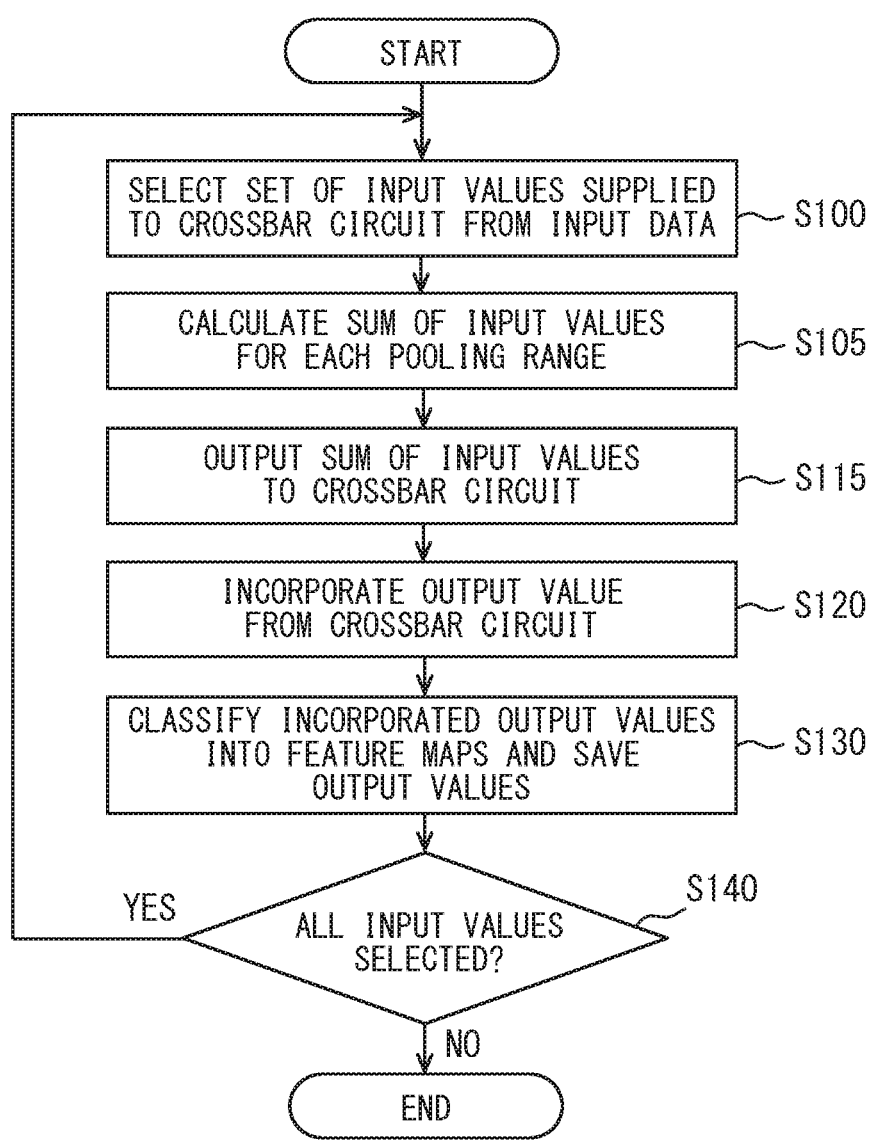
FIG. 12 is a flowchart illustrating a process performed by a microcomputer to simultaneously perform the pooling operation and the filter convolution operation in the crossbar circuit according to the second embodiment.

Based on a flowchart in FIG. 12, the description below explains a process performed by the microcomputer 40 so that the crossbar circuit 44b simultaneously performs the pooling operation and the filter convolution operation at each shift position. The flowchart in FIG. 12 includes the same step numbers as those of the flowchart in FIG. 10 corresponding to the reciprocally similar steps of the process.

In S100, the process selects a set of input values (pixel values) to be input to the input bar 50 of the crossbar circuit 44b from an input image. Similarly to S100 of the flowchart in FIG. 10, the selection of a set of input values selects all input values needed to acquire each pooling operation result needed for the filter convolution operation at each shift position of the filter in the third convolution layer 23 succeeding the first pooling layer 28 from the output data output from the second convolution layer 22 preceding the first pooling layer 28.

In S105, the process calculates the sum of input values based on all the selected input values correspondingly to the target range of each pooling operation. In S115, the process outputs the sum of input value corresponding to the target range of each pooling operation to the crossbar circuit 44b. Then, the D/A converter circuit 43 converts a digital signal corresponding to the output sum of input values into an analog signal and inputs the analog signal to the crossbar circuit 44b.

In S120, the microcomputer 40 incorporates the output value from the crossbar circuit 44b. Specifically, the A/D converter circuit 45 converts the analog signal output from the crossbar circuit 44b into a digital signal. The microcomputer 40 incorporates the converted digital signal. Outputs are available after processed at specified positions of the filters by as many convolution operations and average pooling operations as the filters used for the third convolution layer 23. The A/D converter circuit 45 converts the outputs into digital signals and outputs the digital signals. In S130, the microcomputer 40 classifies the digital signals output from the A/D converter circuit 45 into the filters and accordingly stores the digital signals in the RAM 42.

In S140, the process shifts the filter to cover the entire range of the input image and determines whether all sets of input values are completely selected. If a set of unselected input values remains, control returns to S100 and the above-described process is repeated.

Third Embodiment

The description below explains the second embodiment of the convolutional neural network according to the present disclosure with reference to the accompanying drawings. A configuration to provide the convolutional neural network according to the present embodiment equals the configuration to provide the convolutional neural network according to the first and second embodiments. Therefore, a description of the configuration is omitted for simplicity.

The present embodiment assumes that a specifically sized window to settle the target range of the pooling operation is shifted to partially overlap an adjacent pooling range at least in one of the row direction and the column direction. The description below explains an example where the window partially overlaps an adjacent window in the row direction and the column direction.

The third embodiment is characterized by being able to miniaturize a crossbar circuit 44c under the above-described assumption. Features of the third embodiment will be described in detail with reference to the accompanying drawings. The present embodiment also describes an example configuration of simultaneously performing the pooling operation and the filter convolution operation on the first pooling layer 28 and the third convolution layer 23.

Figure 13:
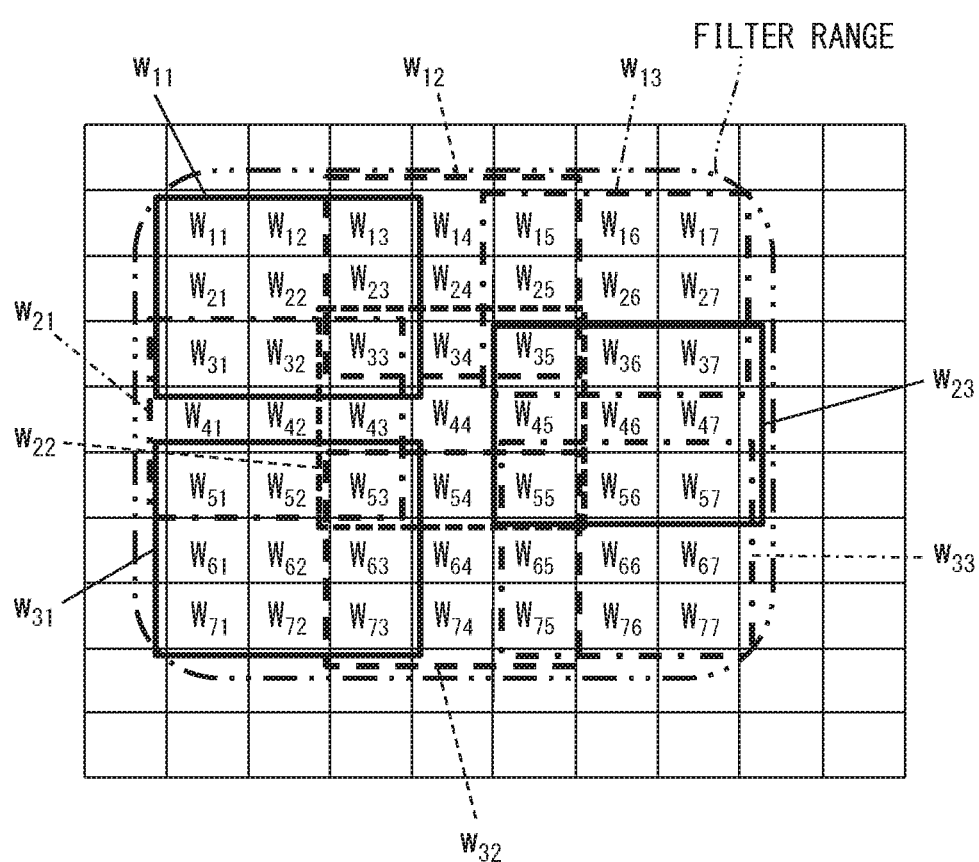
FIG. 13 is a diagram illustrating the relationship between a window to settle a target range of pooling operation and a filter range to be convoluted based on the pooling operation result according to a third embodiment.

FIG. 13 illustrates the relationship between a window to settle the target range of the pooling operation and the range of a filter to be convoluted correspondingly to the pooling operation result. In FIG. 13, the window size is 3×3 and the filter size is also 3×3. As illustrated in FIG. 13, the filter provides the target range of each pooling operation with weights that are represented as $W_{11}$ through $W_{13}$, $W_{21}$ through $W_{23}$, and $W_{31}$ through $W_{33}$ corresponding to the respective window positions in the filter. In FIG. 13, the second convolution layer 22 preceding the first pooling layer 28 outputs input values that are input to the first pooling layer 28. Weights for the input values are represented as $W_{11}$ through $W_{17}$, $W_{21}$ through $W_{27}$, $W_{31}$ through $W_{37}$, $W_{41}$ through $W_{47}$, $W_{51}$ through $W_{57}$, $W_{61}$ through $W_{67}$, and $W_{71}$ through $W_{77}$ corresponding to the input value positions.

The weights given to the target range of each pooling operation include $W_{11}$ through $W_{13}$, $W_{21}$ through $W_{23}$, and $W_{31}$ through $W_{33}$. The weights for the input values include $W_{11}$ through $W_{17}$, $W_{21}$ through $W_{27}$, $W_{31}$ through $W_{37}$, $W_{41}$ through $W_{47}$, $W_{51}$ through $W_{57}$, $W_{61}$ through $W_{67}$, and $W_{71}$ through $W_{77}$. Concerning these weights, the reference position is defined at the top left of the filter illustrated in FIG. 13, for convenience sake. Row numbers increase in the row direction (to the right of the drawing). Column numbers increase in the column direction (to the bottom of the drawing).

To miniaturize the crossbar circuit 44c, the present embodiment performs a prior process (to be described) to calculate a weight to be assigned to each memristor 53 of the crossbar circuit 44c and defines a calculation equation to calculate an input value to be input to each input bar 50.

FIG. 14 illustrates the above-described weights $W_{11}$ through $W_{17}$, $W_{21}$ through $W_{27}$, $W_{31}$ through $W_{37}$, $W_{41}$ through $W_{47}$, $W_{51}$ through $W_{57}$, $W_{61}$ through $W_{67}$, and $W_{71}$ through $W_{77}$ for input values by using the weights $W_{11}$ through $W_{13}$, $W_{21}$ through $W_{23}$, and $W_{23}$ through $W_{33}$ applied by the filter to the target range of each pooling operation. As seen from FIGS. 13 and 14, weights $W_{11}$ through $W_{17}$, $W_{21}$ through $W_{27}$, $W_{31}$ through $W_{37}$, $W_{41}$ through $W_{47}$, $W_{51}$ through $W_{57}$, $W_{61}$ through $W_{67}$, and $W_{71}$ through $W_{77}$ for the inputs depend on how many windows the input value belongs to. Namely, the weight for an input value belonging to only one window is given to the target range of the pooling operation defined in the one window. The weight for input values belonging to two windows results from adding weights given the target ranges of the pooling operation defined in the two windows. The weight for input values belonging to four windows results from adding weights given the target ranges of the pooling operation defined in the four windows.

According to the present embodiment, the window shifts to partially overlap an adjacent window in the row direction and the column direction. As above, weights $W_{11}$ through $W_{17}$, $W_{21}$ through $W_{27}$, $W_{31}$ through $W_{37}$, $W_{41}$ through $W_{47}$, $W_{51}$ through $W_{57}$, $W_{61}$ through $W_{67}$, and $W_{71}$ through $W_{77}$ for the input values are represented by use of weights $W_{11}$ through $W_{13}$, $W_{21}$ through $W_{23}$, and $W_{31}$ through $W_{33}$ given to the target range of each pooling operation. The consequence is to generate a plurality of rows each having the same filter weight and a plurality of columns each having the same filter weight corresponding to all input values. As illustrated in FIG. 14, for example, the same weight element unexceptionally corresponds to each of weights $W_{11}$ through $W_{17}$ for the input values in the first row and weights $W_{21}$ through $W_{27}$ for the input values in the second row. Similarly, the same weight element unexceptionally corresponds to each of weights $W_{61}$ through $W_{67}$ for the input values in the sixth row and weights $W_{71}$ through $W_{77}$ for the input values in the seventh row.

As illustrated in FIG. 15, the present embodiment aggregates a plurality of rows given the same weight for the input values into one row as an aggregation target. The process of aggregating a plurality of rows given the same weight into one row is depicted as a first aggregation process.

FIG. 15 also illustrates weights for the input values after the first aggregation process. As above, the first and second rows are aggregated into one row. The result is to leave weights $W_{11}$ through $W_{17}$ for the input values in the first row and delete weights $W_{21}$ through $W_{27}$ in the second row. Similarly, the sixth and seventh rows are aggregated into one row. The result is to leave weights $W_{61}$ through $W_{67}$ in the sixth row and delete weights $W_{71}$ through $W_{77}$ in the seventh row.

The present embodiment also performs a process to aggregate input values in response to the process of aggregating rows having the same weight into one row. The first aggregation process includes the process of aggregating rows having the same weight element into one row and the process of aggregating input values in the rows. Since the rows having the same weight are aggregated into one row, the input value aggregation process settles a calculation equation that adds input values corresponding to each row belonging to the aggregated rows and calculates an input value for one row corresponding to the weight for the one aggregated row. The process adds input values corresponding to each row belonging to the aggregated rows. The added input value is assumed to be an input value corresponding to the weight for a row except the rows. Therefore, the same operation result is available before and after the aggregation process.

The input value aggregation process will be described more specifically based on FIGS. 16 and 17. As illustrated in FIG. 16, input values in the rows corresponding to weights $W_{11}$ through $W_{77}$ in the rows after the first aggregation process are represented as $I_{11}$ through $I_{17}$, $I_{31}$ through $_{37}$, $I_{41}$ through $I_{47}$, $I_{51}$ through $I_{57}$, and $I_{61}$ through $I_{67}$. FIG. 17 represents input values $I_{11}$ through $I_{17}$, $I_{31}$ through $I_{37}$, $I_{41}$ through $I_{47}$, $I_{51}$ through $I_{57}$, and $I_{61}$ through $I_{67}$ in the rows after the first aggregation process by using original input values $I_{11}$ through $I_{17}$, $I_{21}$ through $I_{27}$, $I_{31}$ through $I_{37}$, $I_{41}$ through $I_{47}$, $I_{51}$ through $i_{57}$, $i_{61}$ through $i_{67}$, and $i_{71}$ through $i_{77}$ that are output from the second convolution layer 22 and are input to the first pooling layer 28.

As illustrated in FIG. 15, the first aggregation process does not aggregate weights $W_{31}$ through $W_{37}$, $W_{41}$ through $W_{47}$, and $W_{51}$ through $W_{57}$ in the third through fifth rows as above. Therefore, as illustrated in FIG. 17, input values $I_{31}$ through $I_{37}$, $I_{41}$ through $I_{47}$, and $I_{51}$ through $I_{57}$ in the second through fourth rows after the first aggregation process are equal to input values $i_{31}$ through $i_{37}$, $i_{41}$ through $i_{47}$, and $i_{51}$ through $i_{57}$ in the third through fifth rows before the aggregation process, respectively. Meanwhile, the first aggregation process aggregates weights $W_{11}$ through $W_{17}$ and $W_{21}$ through $W_{27}$ in the first and second rows into one row of weights $W_{11}$ through $W_{17}$ in the first row. The calculation equation is defined to calculate input values $I_{11}$ through$_{17}$ in the first row corresponding to weights $W_{11}$ through $W_{17}$ in the first row by adding elements of the original input values in the first and second rows to each other. Further, the first aggregation process aggregates weights $W_{61}$ through $W_{67}$ and $W_{71}$ through $W_{77}$ in the sixth and seventh rows into one row of weights $W_{61}$ through $W_{67}$ in the sixth row. The calculation equation is defined to calculate input values $I_{61}$ through $I_{67}$ in the fifth row corresponding to the weights in the sixth row by adding elements of the original input values in the sixth and seventh rows to each other.

As above, the present embodiment defines the input value calculation equation so that the first aggregation process aggregates a plurality of rows having the same weight into one row and adds elements of the input values to each other in the row as an aggregation target. After the first aggregation process, the weights in the rows are assigned to the memristor 53 of the crossbar circuit 44c. When an image is practically recognized, the microcomputer 40 supplies the input bar 50 of the crossbar circuit 44c with an input value calculated according to the calculation equation in FIG. 17. It is possible to decrease the number of input bars 50 and miniaturize the crossbar circuit 44c.

Just the above-described first aggregation process can miniaturize the crossbar circuit 44c. To further miniaturize the crossbar circuit 44c, the first aggregation process may be succeeded by a second aggregation process that aggregates a plurality of rows having the same weight, adds elements of input values to each other in the aggregated row, and settles an input value calculation equation.

The second aggregation process will be described more specifically based on FIGS. 18 through 23. FIG. 18 illustrates columns of weights corresponding to the input values after the first aggregation process. As illustrated in FIG. 18, weights $W_{11}$, $W_{31}$, $W_{41}$, $W_{51}$, and $W_{61}$ in the first column and weights $W_{12}$, $W_{32}$, $W_{42}$, $W_{52}$, and $W_{62}$ in the second column correspondingly include the same elements after the first aggregation process. Similarly, weights $W_{16}$, $W_{36}$, $W_{46}$, $W_{56}$, and $W_{66}$ in the sixth column and weights $W_{17}$, $W_{37}$, $W_{47}$, $W_{57}$, and $W_{67}$ in the seventh column correspondingly include the same elements after the first aggregation process.

Figures 19, 20:
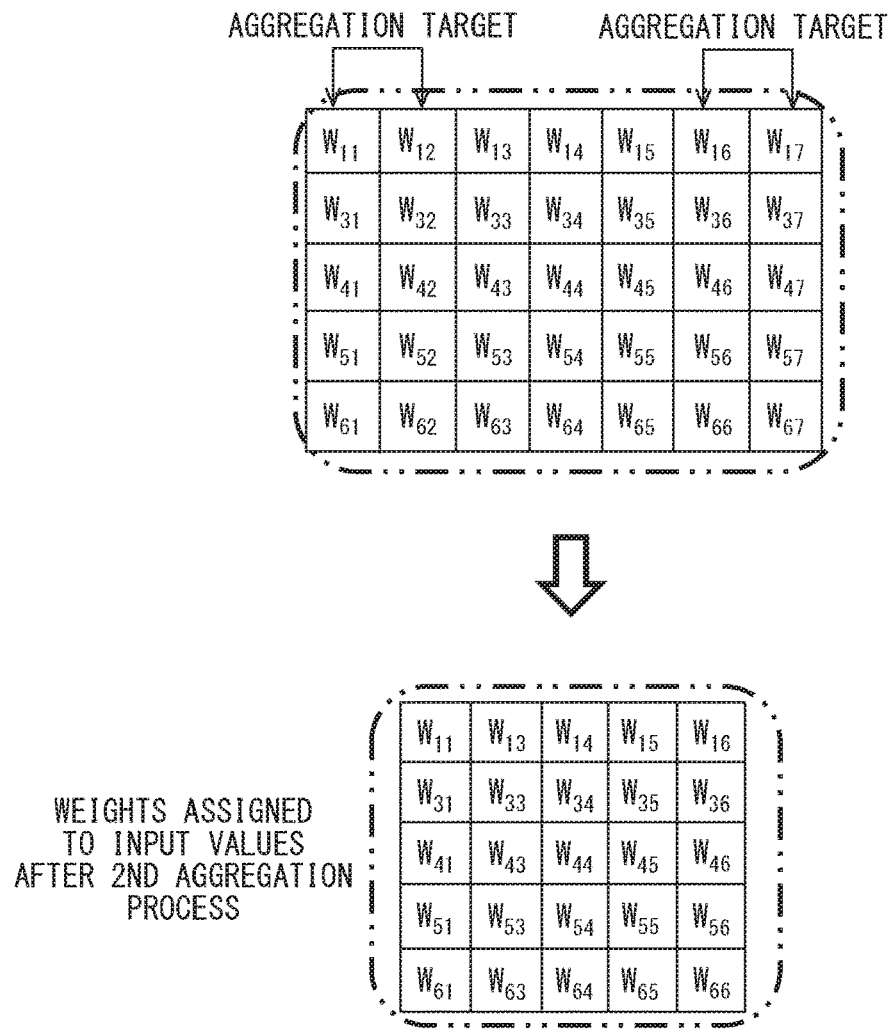
FIG. 19 is a diagram illustrating a second aggregation process that aggregates a plurality of columns having the same weight in a range after the first aggregation process into one column as an aggregation target.
FIG. 20 is a diagram illustrating input values belonging to a range after the second aggregation process aggregates a plurality of columns having the same weight into one column.

As illustrated in FIG. 19, the present embodiment performs the second aggregation process that is targeted at a range after the first aggregation process and aggregates a plurality of columns having the same weight into one column. The plurality of columns may be referred to as an aggregation target.

FIG. 19 illustrates a range after the second aggregation process. According to the example in FIG. 19, the first and second columns are aggregated into one column to leave only weights $W_{11}$, $W_{31}$, $W_{41}$, $W_{51}$, and $W_{61}$ in the first column and delete weights $W_{12}$, $W_{32}$, $W_{42}$, $W_{52}$, and $W_{62}$ in the second column. Similarly, the sixth and seventh columns are aggregated into one column to leave only weights $W_{16}$, $W_{36}$, $W_{46}$, $W_{56}$, and $W_{66}$ in the sixth column and delete weights $W_{17}$, $W_{37}$, $W_{47}$, $W_{57}$, and $W_{67}$ in the seventh column.

The present embodiment also performs a process to aggregate input values in the columns in response to the second aggregation process that aggregates a plurality of columns having the same weight into one column in the range after the first aggregation process. Since the columns having the same filter weight are aggregated into one column, the input value aggregation process settles a calculation equation that adds column elements of the input values to each other corresponding to the aggregated columns and calculates an input value. As above, a plurality of columns having the same weight elements are aggregated into one column in the range after the first aggregation process. The further operation is to add input values in the columns corresponding to the aggregated columns. The added input value is assumed to be an input value corresponding to the weight for a column except the columns. Therefore, the same operation result is available before and after the second aggregation process.

The input value aggregation process in the second aggregation process will be described more specifically based on FIGS. 20 and 21. FIG. 20 illustrates input values $I'_{11}$, $I'_{31}$, $I'_{41}$, $I'_{51}$, and $I'_{61}$ in the first column, input values $I'_{13}$, $I'_{33}$, $I'_{43}$, $I'_{53}$, and $I'_{63}$ in the second column, input values $I'_{14}$, $I'_{34}$, $I'_{44}$, $I'_{54}$, and $I'_{64}$ in the third column, input values $I'_{15}$, $I'_{35}$, $I'_{45}$, $I'_{55}$, and $I'_{65}$ in the fourth column, and input values $I'_{16}$, $I'_{36}$, $I'_{46}$, $I'_{56}$, and $I'_{66}$ in the fifth column after the second aggregation process aggregates a plurality of columns having the same weight. FIG. 21 illustrates the relationship among input values $I'_{11}$, $I'_{31}$, $I'_{41}$, $I'_{51}$, $I'_{61}$, $I'_{13}$, $I'_{33}$, $I'_{43}$, $I'_{53}$, $I'_{63}$, $I'_{14}$, $I'_{34}$, $I'_{44}$, $I'_{54}$, $I'_{64}$, $I'_{15}$, $I'_{35}$, $I'_{45}$, $I'_{55}$, $I'_{65}$, $I'_{16}$, $I'_{36}$, $I'_{46}$, $I'_{56}$, and $I'_{66}$ in the columns after the second aggregation process aggregating a plurality of columns having the same weight, input values $I_{11}$ through $I_{17}$, $I_{31}$ through $I_{37}$, $I_{41}$ through $I_{47}$, $I_{51}$ through $I_{57}$, and $I_{61}$ through $I_{67}$ after the first aggregation process, and original input values $i_{11}$ through $i_{17}$, $i_{21}$ through $i_{27}$, $i_{31}$ through $i_{37}$, $i_{41}$ through $i_{47}$, $i_{51}$ through $i_{57}$, $i_{61}$ through $i_{67}$, and $i_{71}$ through $i_{77}$.

As above, the second aggregation process is not applied to weights $W_{13}$, $W_{33}$, $W_{43}$, $W_{53}$, and $W_{63}$ in the third column, weights $W_{14}$, $W_{34}$, $W_{44}$, $W_{54}$, and $W_{64}$ in the fourth column, and weights $W_{15}$, $W_{35}$, $W_{45}$, $W_{55}$, and $W_{65}$ in the fifth column. As illustrated in FIG. 21, input values $I'_{13}$, $I'_{33}$, $I'_{43}$, $I'_{53}$, and $I'_{63}$ in the second column, input values $I'_{14}$, $I'_{34}$, $I'_{44}$, $I'_{54}$, and $I'_{64}$ in the third column, and input values $I'_{15}$, $I'_{35}$, $I'_{45}$, $I'_{55}$, and $I'_{65}$ in the fourth column are equal to input values $I_{13}$, $I_{33}$, $I_{43}$, $I_{53}$, and $I_{63}$ in the third column, input values $I_{14}$, $I_{34}$, $I_{44}$, $I_{54}$, and $I_{64}$ in the fourth column, and input values $I_{15}$, $I_{35}$, $I_{45}$, $I_{55}$, and $I_{65}$ in the fifth column in the range after the first aggregation process, respectively. As illustrated in FIG. 19, the second aggregation process aggregates weights $W_{11}$, $W_{31}$, $W_{41}$, $W_{51}$, and $W_{61}$ in the first column and weights $W_{12}$, $W_{32}$, $W_{42}$, $W_{52}$, and $W_{62}$ in the second column into one column of weights $W_{11}$, $W_{31}$, $W_{41}$, $W_{51}$, and $W_{61}$. As illustrated in FIG. 21, a calculation equation is settled to calculate input values $I'_{11}$, $I'_{31}$, $I'_{41}$, $I'_{51}$, and $I'_{61}$ corresponding to the first column in the range after the second aggregation process by adding the elements of input values to each other in the first and second columns in the range after the first aggregation process. As illustrated in FIG. 19, the second aggregation process aggregates weights $W_{16}$, $W_{36}$, $W_{46}$, $W_{56}$, and $W_{66}$ in the sixth column and weights $W_{17}$, $W_{37}$, $W_{47}$, $W_{57}$, and $W_{67}$ in the seventh column into one column of weights $W_{16}$, $W_{36}$, $W_{46}$, $W_{56}$, and $W_{66}$. As illustrated in FIG. 21, a calculation equation is settled to calculate input values $I'_{16}$, $I'_{36}$, $I'_{46}$, $I'_{56}$, and $I'_{66}$ corresponding to the fifth column in the range after the second aggregation process by adding the elements of input values to each other in the sixth and seventh columns in the range after the first aggregation process.

According to the present embodiment, the first and second aggregation processes aggregate a plurality of rows having the same weight into one row and aggregate a plurality of columns into one column. The input value calculation equation for aggregated rows is settled to add the elements of input values in the aggregated rows having the same weight. The input value calculation equation for aggregated columns is settled to add the elements of input values in the aggregated columns having the same weight. As illustrated in FIG. 19, the weights corresponding to the input values in the range after the first and second aggregation processes are assigned to the memristor 53 of the crossbar circuit 44c in FIG. 22.

When an image is practically recognized, the microcomputer 40 follows the calculation equations illustrated in FIG. 21 to calculate input values $I'_{11}$, $I'_{31}$, $I'_{41}$, $I'_{51}$, $I'_{61}$, $I'_{13}$, $I'_{33}$, $I'_{43}$, $I'_{53}$, $I'_{63}$, $I'_{14}$, $I'_{34}$, $I'_{44}$, $I'_{54}$, $I'_{64}$, $I'_{15}$, $I'_{35}$, $I'_{45}$, $I'_{55}$, $I'_{65}$, $I'_{16}$, $I'_{36}$, $I'_{46}$, $I'_{56}$, and $I'_{66}$ corresponding to the range after the first and second aggregation processes and supplies the calculated input values to the input bar 50 of the crossbar circuit 44c.

The present embodiment previously performs the first and second aggregation processes to be able to narrow a range of the filter convolution operation in the third convolution layer 23 to be performed on input values for an input image output from the second convolution layer 22 preceding the first pooling layer 28. The result is to be capable of decreasing the number of input values supplied to the crossbar circuit 44c. Therefore, the present embodiment can effectively miniaturize the crossbar circuit 44c when the window to define the target range of the pooling operation is shifted to partially overlap an adjacent pooling range in at least one of the row direction and the column direction.

Figure 22:
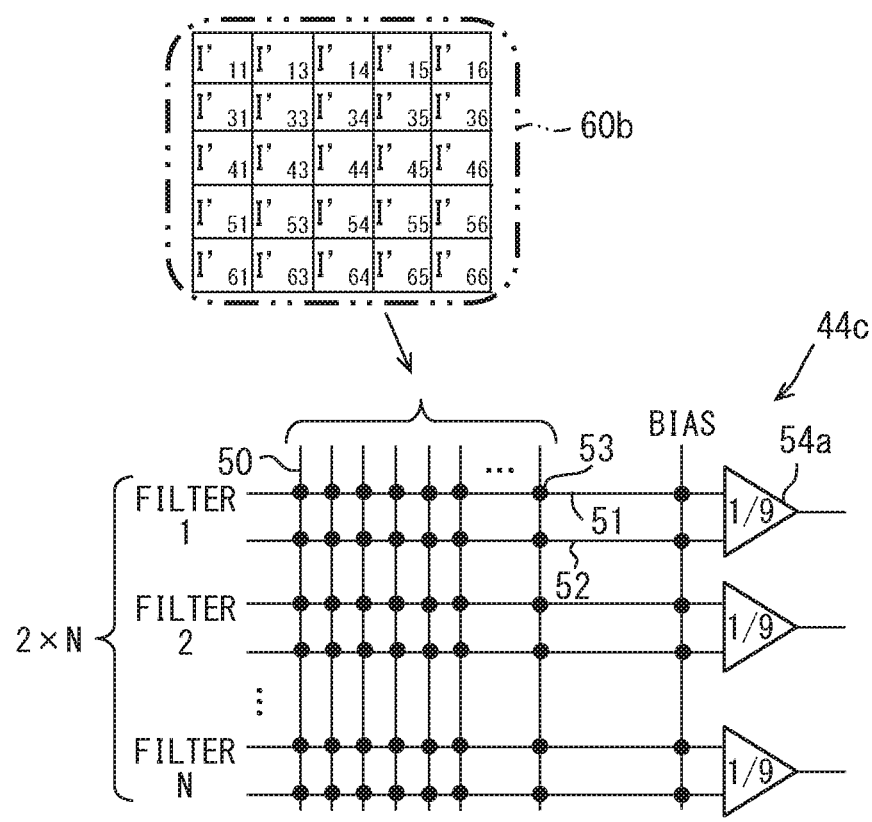
FIG. 22 is a diagram illustrating a configuration according to a third embodiment to perform the pooling operation and the filter convolution operation in the same crossbar circuit.

Each memristor 53 for the crossbar circuit 44c in FIG. 22 is assigned the conductance corresponding to each of the weights for filters 1 through N. The differential operational amplifiers 54a connected to the output bars 51 and 52 output convolution operation results from filters 1 through N. Similarly to the first and second embodiments, the differential operational amplifier 54a has the function as a divider portion that divides a filter convolution operation result for each input value supplied to the input bar 50 by the size of the window to define the target range of the pooling operation. Also according to the present embodiment, the crossbar circuit 44c outputs a result of performing the average pooling operation in the first pooling layer 28 on output data as an input image from the second convolution layer 22 and the filter convolution operation in the third convolution layer 23 on the pooling operation result.

According to the example in FIG. 22, the differential operational amplifier 54a as a divider portion divides input values by the number of convolution operation results included in the pooling range. Similarly to the first embodiment, the microcomputer 40, as a divider portion, receives output data from the crossbar circuit 44c and may divide each value included in the output data by the number of convolution operation results included in the pooling range. Alternatively, each memristor 53 of the crossbar circuit 44a may be given a correction weight resulting from dividing a learned weight by the number of convolution operation results included in a pooling range. Each memristor 53 thereby provides the function as the divider portion. When the microcomputer 40 provides the function as the divider portion, each input value may be modified to a value resulting from dividing each input value by the number of convolution operation results included in the pooling range before the microcomputer 40 supplies each input value to the input bar 50 of the crossbar circuit 44a. The modified input value may be input to the crossbar circuit 44c.

Figure 23:
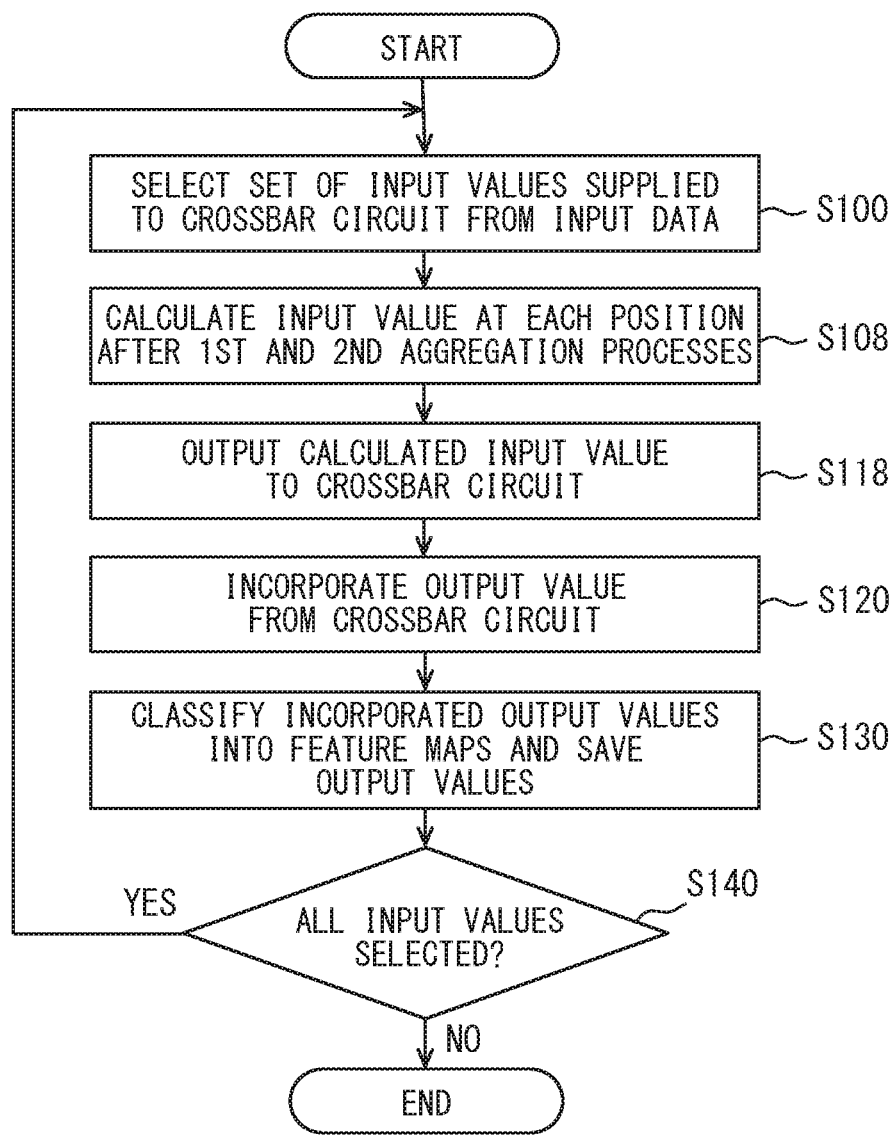
FIG. 23 is a flowchart illustrating a process performed by a microcomputer to simultaneously perform the filter convolution operation and the pooling operation using a filter in the crossbar circuit according to the third embodiment.

Based on a flowchart in FIG. 23, the description below explains a process performed by the microcomputer 40 according to the present embodiment to simultaneously perform the filter convolution operation and the pooling operation in the crossbar circuit 44c.

In S100, the process selects a set of input values (pixel values) to be input to the input bar 50 of the crossbar circuit 44c from an input image. Similarly to the first and second embodiments, the selection of a set of input values selects all input values needed to acquire each pooling operation result needed for the filter convolution operation at each shift position of the filter in the third convolution layer 23 succeeding the first pooling layer 28 from the output data output from the second convolution layer 22 preceding the first pooling layer 28.

In S108, the process uses the calculation equations in FIG. 21 based on all the selected input values to calculate input values corresponding to the positions in the filter after the first and second aggregation processes. The input value calculation equations illustrated in FIG. 21 take effect under the various conditions described by use of FIG. 13. In other words, the input value calculation equations depend on the various conditions that may differ. The input value calculation equations are settled by a prior process and are stored in the memory of the microcomputer 40.

In S118, the process outputs the calculated input value corresponding to at each position in the filter to the crossbar circuit 44c. Then, the D/A converter circuit 43 converts a digital signal corresponding to the outputted input value into an analog signal and inputs the analog signal to the crossbar circuit 44c.

In S120, the microcomputer 40 incorporates the output value from the crossbar circuit 44c. Specifically, the A/D converter circuit 45 converts the analog signal output from the crossbar circuit 44c into a digital signal. The microcomputer 40 incorporates the converted digital signal. Outputs are available after processed at specified positions of the filters by as many convolution operations and average pooling operations as the filters used for the third convolution layer 23. The A/D converter circuit 45 converts the outputs into digital signals and outputs the digital signals. In S130, the microcomputer 40 classifies the digital signals output from the A/D converter circuit 45 into the filters and accordingly stores the digital signals in the RAM 42.

In S140, the process shifts the filter to cover the entire range of the input image and determines whether all sets of input values are completely selected. If a set of unselected input values remains, control returns to S100 and the above-described process is repeated.

There have been described the preferred embodiments of the present disclosure. However, the present disclosure is not limited to the above-mentioned embodiments. However, the disclosure may be otherwise variously modified within the spirit and scope of the disclosure.

According to the third embodiment, for example, the first aggregation process aggregates a plurality of rows having the same weight into one row. The input value calculation equation is settled to add the elements of the input values to each other in the rows. Then, the second aggregation process aggregates a plurality of columns having the same weight in the range after the first aggregation process. The input value calculation equation is settled to add the elements of the input values to each other in the aggregated columns.

However, it is not always necessary to use both the first aggregation process and the second aggregation process. In other words, it may be favorable to aggregate a plurality of rows or columns having the same weight and settle a calculation equation that adds elements of input values in the aggregated rows or columns. In this case, also, the crossbar circuit 44c can be miniaturized.

The example according to the third embodiment does not limit the order of performing both the first aggregation process and the second aggregation process. It may be favorable to first aggregate a plurality of columns having the same weight and perform the second aggregation process to settle an input value calculation equation that adds elements of input values to each other in the aggregated columns. Then, a plurality of rows having the same weight may be aggregated into one row in the range after the second aggregation process. An input value calculation equation may be settled to add elements of input values to each other in the aggregated rows.

The second convolution layer 22 and the fourth convolution layer 24 provide examples of a first convolution layer. The third convolution layer 23 and the fifth convolution layer 25 provide examples of a second convolution layer. The microcomputer 40 provides an example of a control portion. The memristor 53 provides an example of a weight assignment element. The differential operational amplifier 54a provides an example of a divider portion.

It is noted that a flowchart or the processing of the flowchart in the present application includes multiple steps (also referred to as sections), each of which is represented, for instance, as S100. Further, each step can be divided into several sub-steps while several steps can be combined into a single step.

While various embodiments, configurations, and aspects of convolutional neural network according to the present disclosure have been exemplified, the embodiments, configurations, and aspects of the present disclosure are not limited to those described above. For example, embodiments, configurations, and aspects obtained from an appropriate combination of technical elements disclosed in different embodiments, configurations, and aspects are also included within the scope of the embodiments, configurations, and aspects of the present disclosure.

What is claimed is:

1. A image recognition system comprising:
a first convolution layer that shifts a first filter having a predetermined size in a predetermined stride in a two-dimensional direction to target an image data having values, and performs a first filter convolution operation at each shift position with the first filter to obtain convolution operation results;
a pooling layer that performs a pooling operation on each pooling range with respect to the convolution operation results arrayed two-dimensionally, obtaining pooling operation results;
a second convolution layer that shifts a second filter having a predetermined size in a predetermined stride in a two-dimensional direction with respect to the pooling operation results arrayed two-dimensionally, and performs a second filter convolution operation at each shift position;
a crossbar circuit that includes
a plurality of input lines,
at least one output line intersecting with the input lines, and
a plurality of weight elements that are provided at intersection points between the input lines and the output line, weights each input value input to the input lines to output to the output line; and
a control portion that selects from the convolution operation results of the first convolution layer, an input value needed to acquire each pooling operation result needed to perform the second filter convolution operation at each shift position, in the second convolution layer, and inputs the input value selected to the input lines,
wherein:
the crossbar circuit supplies the input values input to the input lines with the weight corresponding to a position in the second filter for the pooling operation result operated from each of the input values, adds the weighted input values by the output line, and outputs an output result from the output line;
the image recognition system further comprises a divider portion that sets the output value output from the output line to a value obtained through division by a total number of the convolution operation results included in the pooling range; and
the crossbar circuit simultaneously performs (i) an average pooling operation on the convolution operation results from the first convolution layer and (ii) the second filter convolution operation on a result of the average pooling operation.

2. A convolutional neural network comprising:
a first convolution layer that shifts a first filter having a predetermined size in a predetermined stride in a two-dimensional direction to target input data including input values arrayed two-dimensionally, and performs a first filter convolution operation at each shift position with the first filter to obtain convolution operation results;
a pooling layer that performs a pooling operation on each pooling range of input values comparable to the convolution operation results arrayed two-dimensionally, obtaining pooling operation results;
a second convolution layer that shifts a second filter having a predetermined size in a predetermined stride in a two-dimensional direction to target input values comparable to the pooling operation results arrayed two-dimensionally, and performs a second filter convolution operation at each shift position;

a crossbar circuit that includes
a plurality of input bars,
at least one output bar intersecting with the input bars, and
a plurality of weight assignment elements that are provided at intersection points between the input bars and the output bar, weights each input value input to the input bars to output to the output bar; and
a control portion that selects from the convolution operation results of the first convolution layer, an input value needed to acquire each pooling operation result needed to perform the second filter convolution operation at each shift position, in the second convolution layer, and inputs the input value selected to the input bars, wherein:
the crossbar circuit supplies the input values input to the input bars with the weight corresponding to a position in the second filter for the pooling operation result operated from each of the input values, adds the weighted input values by the output bar, and outputs an output result from the output bar;
the convolutional neural network further comprises a divider portion that sets the output value output from the output bar to a value obtained through division by a total number of the convolution operation results included in the pooling range; and
the crossbar circuit simultaneously performs (i) an average pooling operation on the convolution operation results from the first convolution layer and (ii) the second filter convolution operation on a result of the average pooling operation.

3. The convolutional neural network according to claim 2, wherein:
the second convolution layer as the second filter performs a convolution operation with a plurality of filters;
the crossbar circuit includes the output bars corresponding to a total number of the filters; and
each of the output bars outputs an output value after the pooling operation and the convolution operation corresponding to each of the filters.

4. The convolutional neural network according to claim 2, wherein:
the weight assignment element is given a weight based on a result of learning which is externally performed.

5. The convolutional neural network according to claim 2, wherein:
the control portion supplies the respective input bars with all input values that are selected from the convolution operation results in the first convolution layer and are needed to acquire each pooling operation result needed for the second filter convolution operation at each shift position of the second filter in the second convolution layer; and
the crossbar circuit supplies all input values at each shift position of the second filter to be input with a weight corresponding to a position in the second filter for the pooling operation result arithmetically operated from input values, and adds the weighted input values at the output bar.

6. The convolutional neural network according to claim 5, wherein:
the divider portion divides one of the input value input to the crossbar circuit and the output value output from the crossbar circuit by the number of convolution operation results included in the pooling range.

7. The convolutional neural network according to claim 5, wherein:
the divider portion modifies the weight provided from the weight assignment element to a weight obtained by dividing the weight provided from the weight assignment element by the number of the convolution operation results included in the pooling range, and supplies the weight modified to each input value.

8. The convolutional neural network according to claim 2, wherein:
the control portion calculates a sum of input values included in a target range of each pooling operation by using all input values selected from the convolutional operation results in the first convolution layer and needed to acquire each pooling operation result needed for the second convolution operation at each shift position of the second filter, and supplies the input bars with the calculated sum of input values; and
the crossbar circuit supplies the sum input of the input values with the weight corresponding to a position in the second filter for each pooling operation result, and adds the sum at the output bar.

9. The convolutional neural network according to claim 8, wherein:
the divider portion divides the output value output from the crossbar circuit by the number of the convolution operation results included in the pooling range.

10. The convolutional neural network according to claim 8, wherein:
the divider portion modifies the weight provided from the weight assignment element to a weight obtained by dividing the weight provided from the weight assignment element by the number of the convolution operation results included in the pooling range to the weight, and supplies the weight modified to each input value.

11. The convolutional neural network according to claim 2, wherein:
the pooling range is shifted to partially overlap an adjacent pooling range in at least one of a row direction or a column direction;
the control portion performs
an aggregation process that specifies one of a plurality of rows and a plurality of columns including input values supplied with an identical weight in one of the row direction and the column direction in case of overlapping pooling ranges, the input values being used to acquire each pooling operation result needed for the second filter convolution operation at each shift position of the second filter in the second convolution layer, adds corresponding input values to each other included in one of the specified plurality of rows and the specified plurality of columns, and aggregates input values into one of a row of input values and a column of input values;
the control portion supplies the input bars with the input values included in a range narrowed by the aggregation process; and
in response to that the crossbar circuit supplies each input value to be input with a weight corresponding to a position in the second filter for each pooling operation result, the weight supplied to an input value belonging to a plurality of pooling ranges is an added weight resulting from adding a plurality of weights supplied to the pooling ranges.

12. The convolutional neural network according to claim 2, wherein:
the pooling range is shifted in a row direction and a column direction to partially overlap an adjacent pooling range;
when the pooling ranges are overlapped to acquire each pooling operation result needed for the second filter convolution operation at each shift position of the second filter in the second convolution layer,
the control portion performs
a first aggregation that specifies one of a plurality of rows and a plurality of columns including input values provided with an identical weight in one of a row direction and a column direction, adds corresponding input values to each other included in the specified one of the plurality of rows and the plurality of columns, and aggregates input values into one of a row of input values and a column of input values;
the control portion further performs
a second aggregation process that specifies a different one of the plurality of rows and the plurality of columns including input values provided with an identical weight in the different one of the row direction and the column direction within a range narrowed by the first aggregation process, adds corresponding input values to each other included in the specified one of the plurality of rows and the plurality of columns, and aggregates input values into one of a row of input values and a column of input values;
the control portion supplies the input bars with an input value included in a range narrowed by the first aggregation process and the second aggregation process; and
in response to that the crossbar circuit supplies each input value to be input with a weight corresponding to a position in the second filter for each pooling operation result, the weight supplied to an input value belonging to a plurality of pooling ranges is an added weight resulting from adding a plurality of weights supplied to the pooling ranges.

13. The convolutional neural network according to claim 12, wherein:
the divider portion divides one of the input value input to the crossbar circuit and the output value output from the crossbar circuit by the number of convolution operation results included in the pooling range.

14. The convolutional neural network according to claim 12, wherein:
the divider portion modifies the weight provided from the weight assignment element to a weight obtained by dividing the weight provided from the weight assignment element by the number of the convolution operation results included in the pooling range, and supplies the weight modified to each input value.

* * * * *